US009667331B2

(12) United States Patent
Wei et al.

(10) Patent No.: US 9,667,331 B2
(45) Date of Patent: May 30, 2017

(54) RESTRICTED APERIODIC CSI MEASUREMENT REPORTING IN ENHANCED INTERFERENCE MANAGEMENT AND TRAFFIC ADAPTATION

(71) Applicant: QUALCOMM Incorporated, San Diego, CA (US)

(72) Inventors: Chao Wei, Beijing (CN); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/303,453

(22) PCT Filed: Apr. 17, 2015

(86) PCT No.: PCT/CN2015/076876
§ 371 (c)(1),
(2) Date: Oct. 11, 2016

(87) PCT Pub. No.: WO2015/169147
PCT Pub. Date: Nov. 12, 2015

(65) Prior Publication Data
US 2017/0126299 A1    May 4, 2017

(30) Foreign Application Priority Data

May 9, 2014   (WO) ................ PCT/CN2014/077122

(51) Int. Cl.
*H04B 17/00* (2015.01)
*H04B 7/06* (2006.01)
(Continued)

(52) U.S. Cl.
CPC ........ *H04B 7/0626* (2013.01); *H04J 11/0023* (2013.01); *H04L 5/0053* (2013.01);
(Continued)

(58) Field of Classification Search
None
See application file for complete search history.

(56) References Cited

U.S. PATENT DOCUMENTS 8,929,235 B2 *  1/2015  Baldemair ............ H04W 24/10
                                                         370/252
8,953,475 B2 *  2/2015  Li ........................ H04J 11/0023
                                                         370/252
(Continued)

FOREIGN PATENT DOCUMENTS

CN     102281638 A    12/2011
CN     102291224 A    12/2011
(Continued)

OTHER PUBLICATIONS

International Search Report and Written Opinion—PCT/CN2014/077122—ISA/EPO—Feb. 9, 2015.
(Continued)

*Primary Examiner* — Tuan A Tran
(74) *Attorney, Agent, or Firm* — Anthony R. Morris

(57) ABSTRACT

A method, an apparatus, and a computer program product for wireless communication are provided. The apparatus may be a UE. The UE determines a first CSI subframe set including a first set of subframes of a frame and a second CSI subframe set including a second set of subframes of the frame. Subframes in the first set of subframes are different than subframes in the second set of subframes. The UE determines a CSI reference subframe in one of the first CSI subframe set or the second CSI subframe set. The UE measures CSI in the CSI reference subframe. The UE
(Continued)

receives an aperiodic CSI request in a triggering subframe in one of the first CSI subframe set or the second CSI subframe set. The triggering subframe is after the CSI reference subframe.

26 Claims, 20 Drawing Sheets

(51) Int. Cl.
    *H04J 11/00*     (2006.01)
    *H04W 24/10*     (2009.01)
    *H04L 5/00*     (2006.01)
    *H04W 88/02*     (2009.01)
    *H04L 5/14*     (2006.01)
    *H04W 76/04*     (2009.01)

(52) U.S. Cl.
    CPC ............... *H04W 24/10* (2013.01); *H04L 5/14* (2013.01); *H04W 76/046* (2013.01); *H04W 76/048* (2013.01); *H04W 88/02* (2013.01)

(56) References Cited

U.S. PATENT DOCUMENTS

| | | | |
|---|---|---|---|
| 8,971,881 B2 * | 3/2015 | Nimbalker | H04B 17/309 455/434 |
| 8,976,698 B2 * | 3/2015 | Chen | H04W 24/00 370/252 |
| 9,144,045 B2 * | 9/2015 | Koorapaty | H04W 56/001 |
| 9,219,571 B2 * | 12/2015 | Barbieri | H04L 1/0026 |
| 9,294,230 B2 * | 3/2016 | Han | H04L 1/1657 |
| 9,554,381 B2 * | 1/2017 | Park | H04B 7/04 |
| 2013/0114441 A1 * | 5/2013 | Yoo | H04L 1/0026 370/252 |
| 2013/0223366 A1 * | 8/2013 | Papasakellariou | H04W 72/042 370/329 |
| 2013/0294282 A1 | 11/2013 | Seo | |
| 2013/0322280 A1 * | 12/2013 | Pi | H04W 72/0413 370/252 |
| 2013/0322376 A1 | 12/2013 | Marinier et al. | |
| 2013/0336214 A1 | 12/2013 | Sayana et al. | |
| 2016/0197715 A1 * | 7/2016 | Papasakellariou | H04L 5/1469 370/329 |

FOREIGN PATENT DOCUMENTS

| | | |
|---|---|---|
| CN | 102546110 A | 7/2012 |
| CN | 103748820 A | 4/2014 |
| WO | 2013113273 A1 | 8/2013 |

OTHER PUBLICATIONS

International Search Report and Written Opinion—PCT/CN2015/076876—ISA/EPO—Jul. 22, 2015.

* cited by examiner

RESTRICTED APERIODIC CSI MEASUREMENT REPORTING IN ENHANCED INTERFERENCE MANAGEMENT AND TRAFFIC ADAPTATION

CROSS-REFERENCE TO RELATED APPLICATION(S)

This application is a 35 U.S.C. 371 National Phase of Chinese PCT Application Serial No. PCT/CN2015/076876, entitled "RESTRICTED APERIODIC CSI MEASUREMENT REPORTING IN ENHANCED INTERFERENCE MANAGE-MENT AND TRAFFIC ADAPTATION," and filed on Apr. 17, 2015 which claims the benefit of Chinese PCT Application Serial No. PCT/CN2014/077122, entitled "RESTRICTED APERIODIC CSI MEASUREMENT REPORTING IN ENHANCED INTERFERENCE MANAGEMENT AND TRAFFIC ADAPTATION" and filed on May 9, 2014, both of which are expressly incorporated by reference herein in their entirety.

BACKGROUND

Field

The present disclosure relates generally to communication systems, and more particularly, to restricted aperiodic channel state information (CSI) measurement reporting in enhanced interference management and traffic adaptation.

Background

Wireless communication systems are widely deployed to provide various telecommunication services such as telephony, video, data, messaging, and broadcasts, Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus may be a user equipment (UE). The UE determines a first CSI subframe set including a first set of subframes of a frame and a second CSI subframe set including a second set of subframes of the frame. Subframes in the first set of subframes are different than subframes in the second set of subframes. The UE determines a CSI reference subframe in one of the first CSI subframe set or the second CSI subframe set. The UE measures CSI in the CSI reference subframe. The UE receives an aperiodic CSI request in a triggering subframe in one of the first CSI subframe set or the second CSI subframe set. The triggering subframe is after the CSI reference subframe. The aperiodic CSI request is for the second CSI subframe set when the CSI reference subframe is in the second CSI subframe set and the triggering subframe is in the first CSI subframe set. The aperiodic CSI request is for the first CSI subframe set when the CSI reference subframe is in the first CSI subframe set and the triggering subframe is in the second CSI subframe set.

In an aspect of the disclosure, a method, a computer program product, and an apparatus are provided. The apparatus may be a UE. The UE determines a first CSI subframe set including a first set of subframes of a frame and a second CSI subframe set including a second set of subframes of the frame. Subframes in the first set of subframes are different than subframes in the second set of subframes. The UE determines a CSI reference subframe in one of the first CSI subframe set or the second CSI subframe set. The UE measures CSI in the CSI reference subframe. The UE stores the measured CSI only for the CSI reference subframe. The UE receives an aperiodic CSI request in a triggering subframe in one of the first CSI subframe set or the second CSI subframe set. The triggering subframe is after the CSI reference subframe. The aperiodic CSI request is for the second CSI subframe set when the CSI reference subframe is in the second CSI subframe set and the triggering subframe is in the first CSI subframe set. The aperiodic CSI request is for the first CSI subframe set when the CSI reference subframe is in the first CSI subframe set and the triggering subframe is in the second CSI subframe set.

In an aspect of the disclosure, a method, a computer program product, and an apparatus are provided. The apparatus may be a UE, The UE determines a first CSI subframe set including a first set of subframes of a frame and a second CSI subframe set including a second set of subframes of the frame. Subframes in the first set of subframes are different than subframes in the second set of subframes. The UE determines at least one CSI reference subframe in at least one of the first CSI subframe set or the second CSI subframe set based on at least one of a number of configured carriers or support on each of the carriers for storing a CSI measurement before receiving an aperiodic CSI request for the CSI measurement. The UE measures CSI in the determined at least one CSI reference subframe.

DETAILED DESCRIPTION

Figure 1:
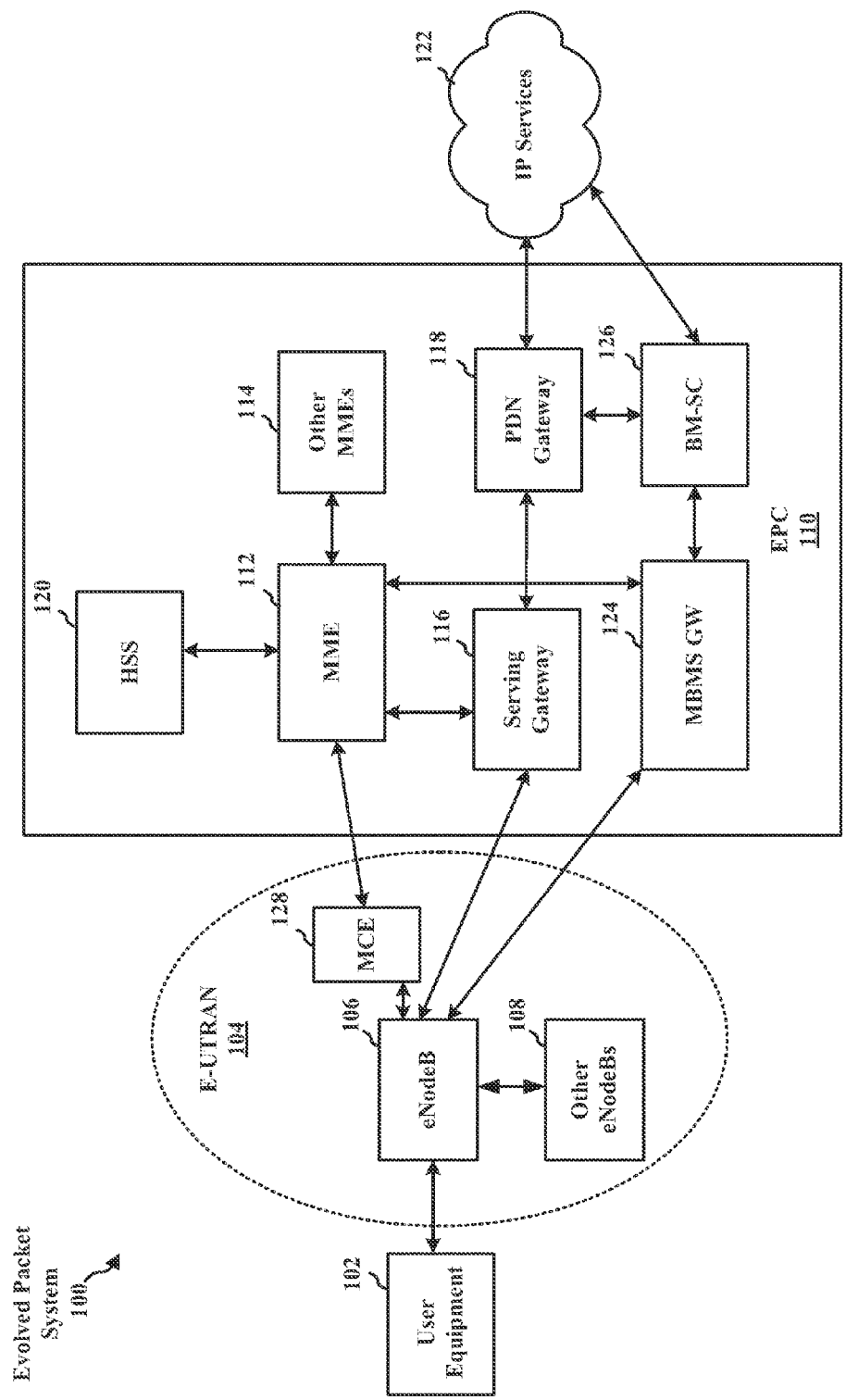
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
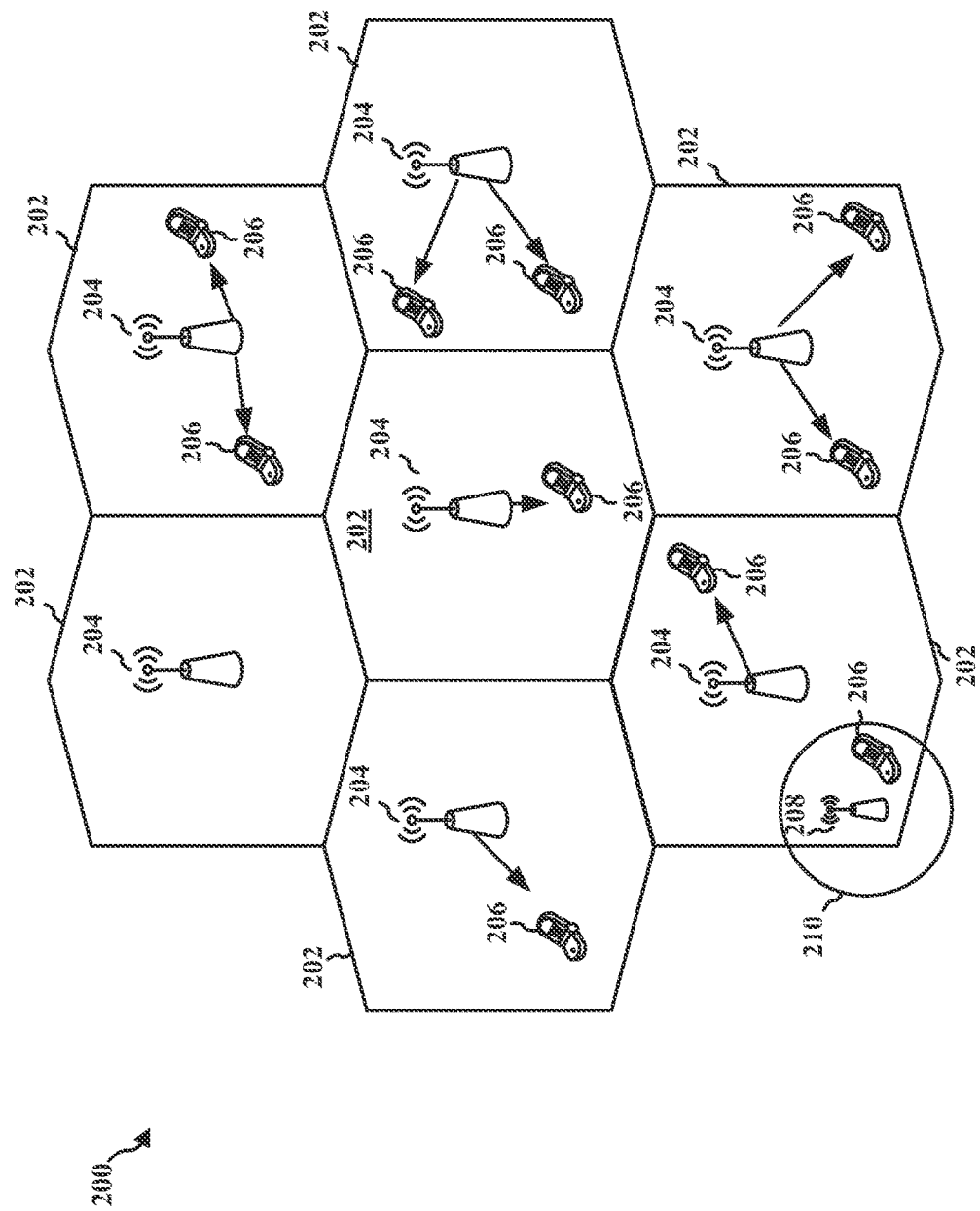
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream, Spatial multiplexing is generally used when channel conditions are good. When channel conditions are less favorable, beamforming may be used to focus the transmission energy in one or more directions. This may be achieved by spatially preceding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
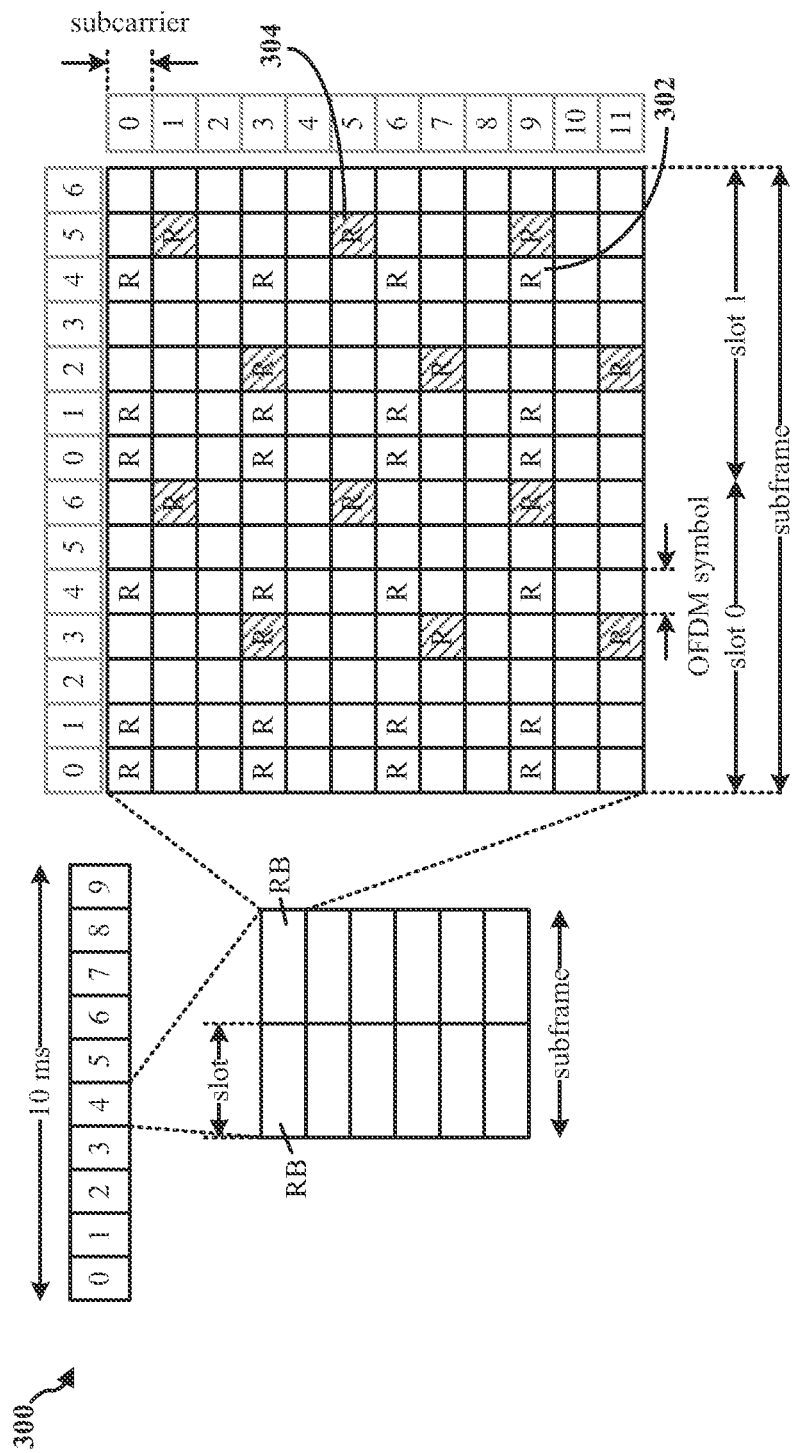
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
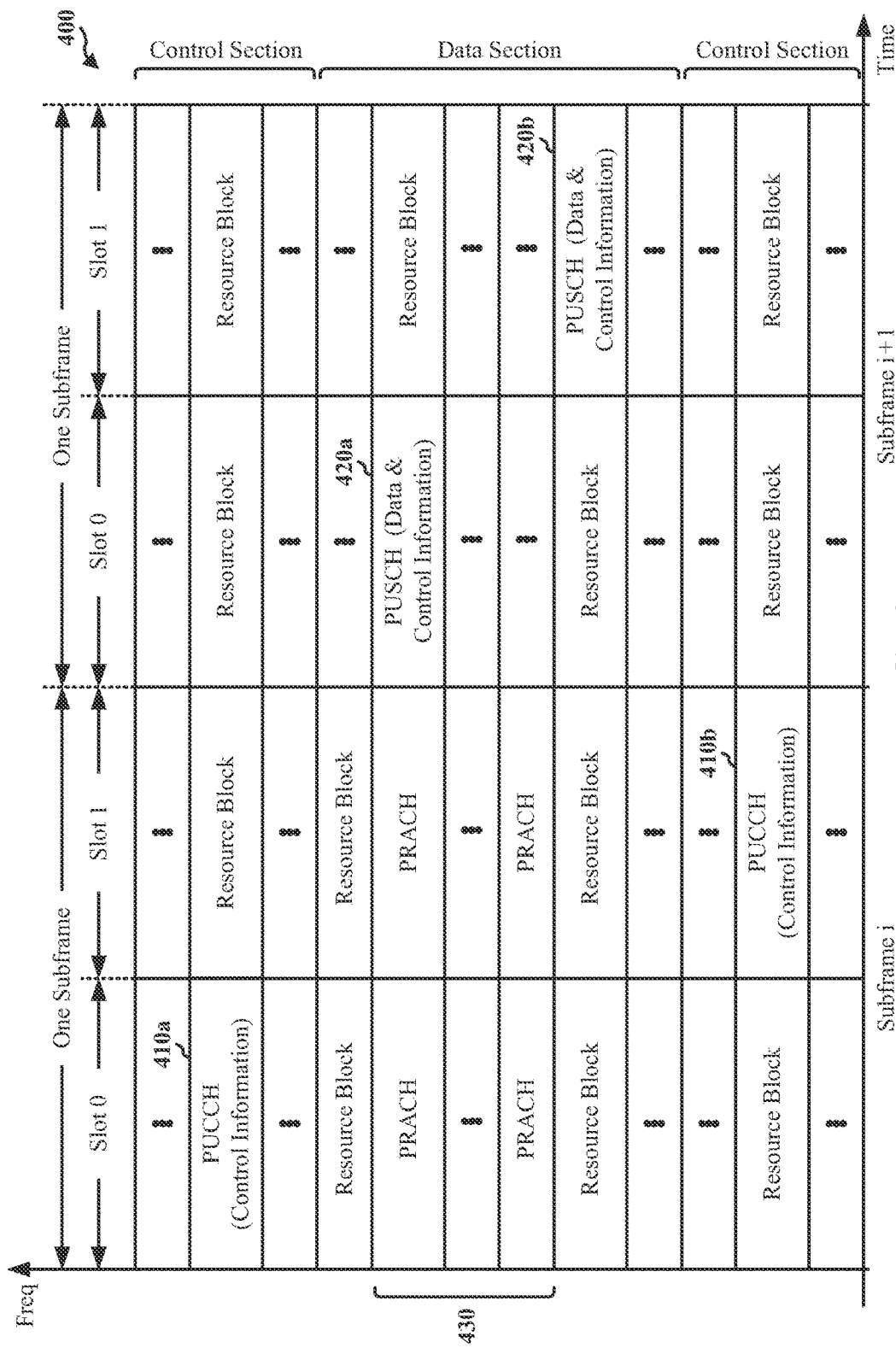
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

Figure 5:
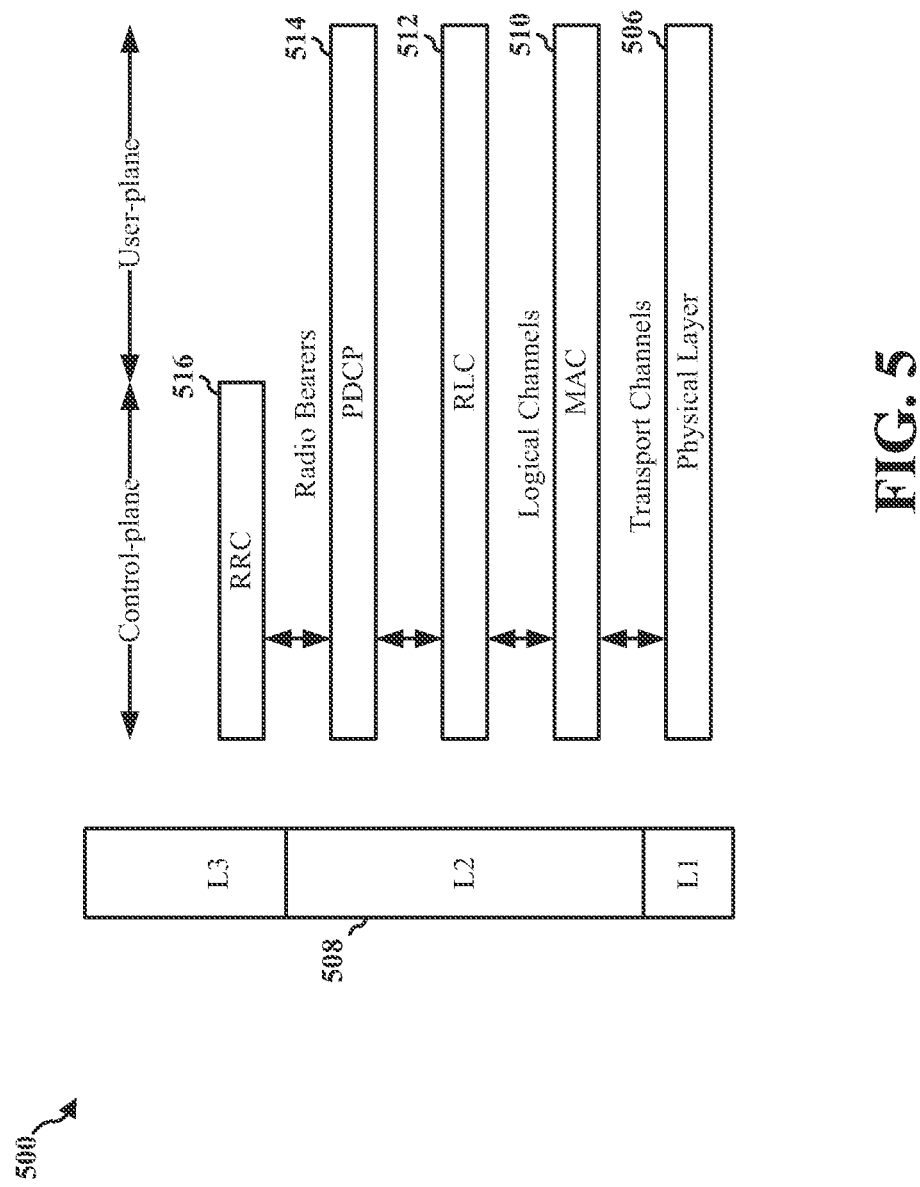
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
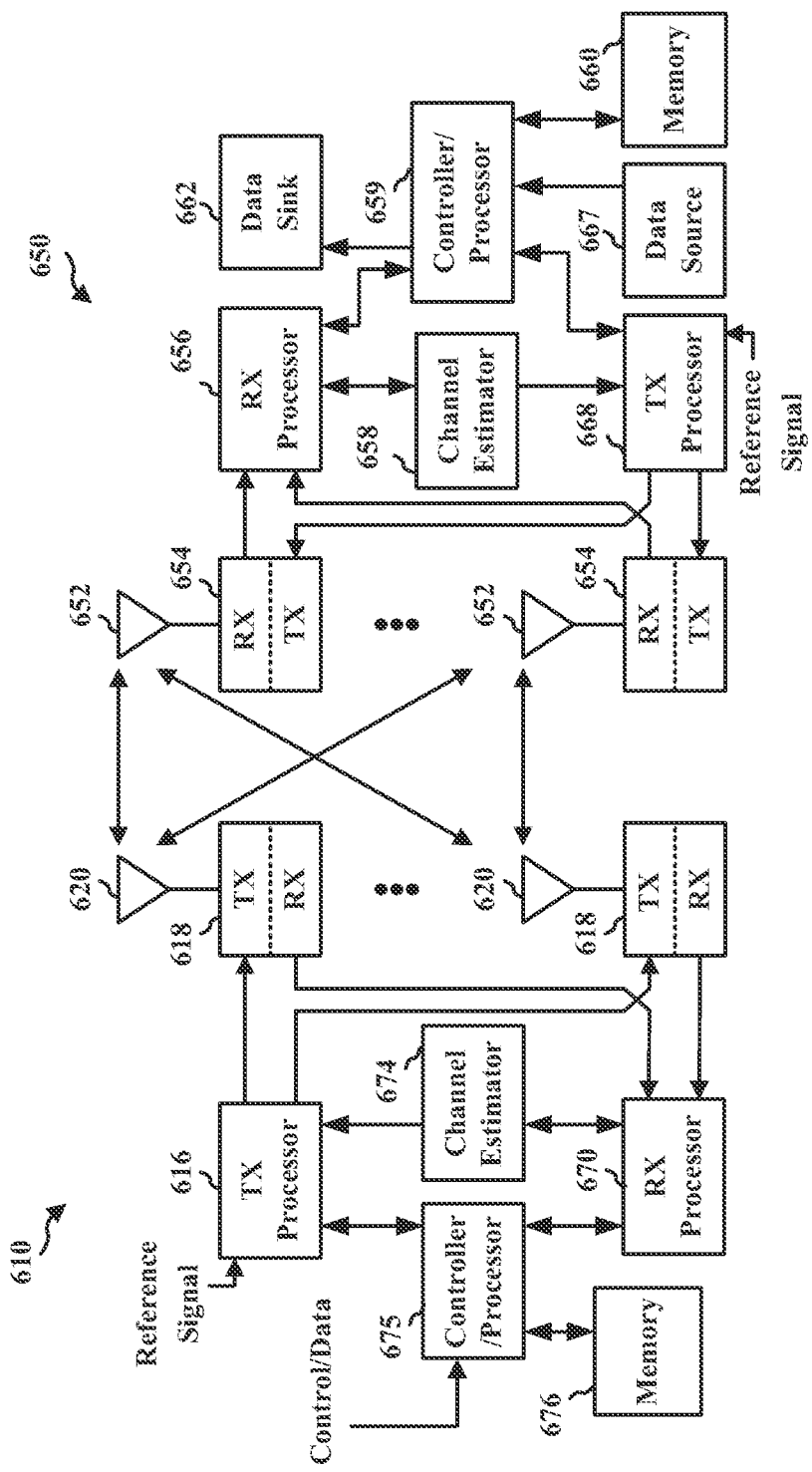
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially preceded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RE carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7A:
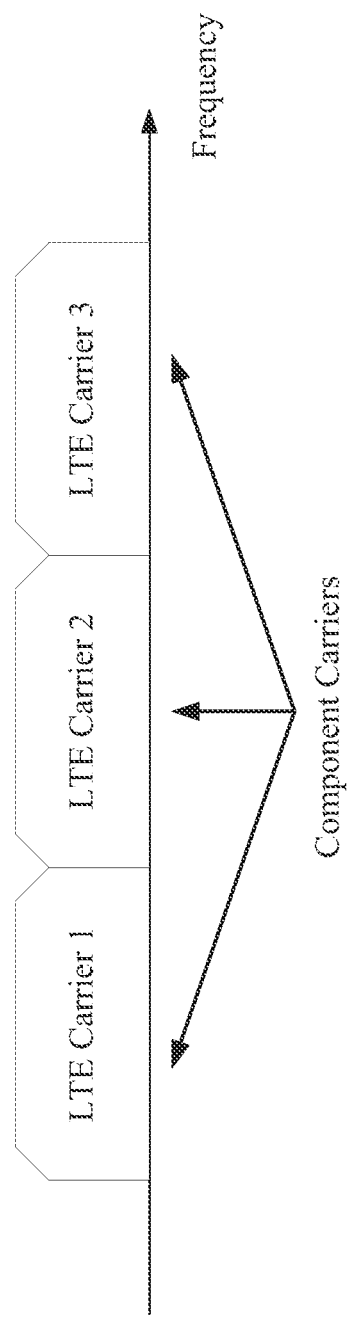
FIG. 7A is a diagram illustrating an example of continuous carrier aggregation.
Figure 7B:
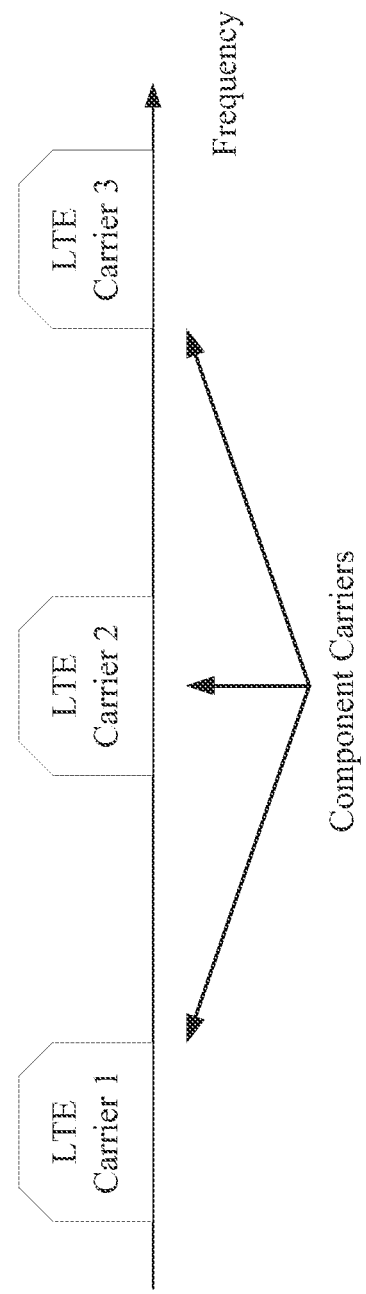
FIG. 7B is a diagram illustrating an example of non-continuous carrier aggregation.

FIG. 7A discloses a continuous carrier aggregation type. FIG. 7B discloses a non-continuous carrier aggregation type. UEs may use spectrum up to 20 MHz bandwidths allocated in a carrier aggregation of up to a total of 100 MHz (5 component carriers) used for transmission in each direction. Generally, less traffic is transmitted on the uplink than the downlink, so the uplink spectrum allocation may be smaller than the downlink allocation. For example, if 20 MHz is assigned to the uplink, the downlink may be assigned 100 Mhz. These asymmetric FDD assignments conserve spectrum and are a good fit for the typically asymmetric bandwidth utilization by broadband subscribers. Two types of carrier aggregation (CA) methods have been proposed, continuous CA and non-continuous CA. The two types of CA methods are illustrated in FIGS. 7A and 7B. Non-continuous CA occurs when multiple available component carriers are separated along the frequency band (FIG. 7B). On the other hand, continuous CA occurs when multiple available component carriers are adjacent to each other (FIG. 7). Both non-continuous and continuous CA aggregates multiple LTE/component carriers to serve a single UE. The component carriers may include a primary component carrier and one or more secondary component carriers. A primary component carrier may be referred to as a primary cell (Pcell) and a secondary component carrier may be referred to as a secondary cell (SCell).

Multiple RF receiving units and multiple FFTs may be deployed with non-continuous CA because the carriers are separated along the frequency band. Because non-continuous CA supports data transmissions over multiple separated carriers across a large frequency range, propagation path loss, Doppler shift, and other radio channel characteristics may vary a lot at different frequency bands. Thus, to support broadband data transmission under the non-continuous CA approach, methods may be used to adaptively adjust coding, modulation, and transmission power for different component carriers. For example, where the eNB has fixed transmitting power on each component carrier, the effective coverage or supportable modulation and coding of each component carrier may be different.

Figure 8:
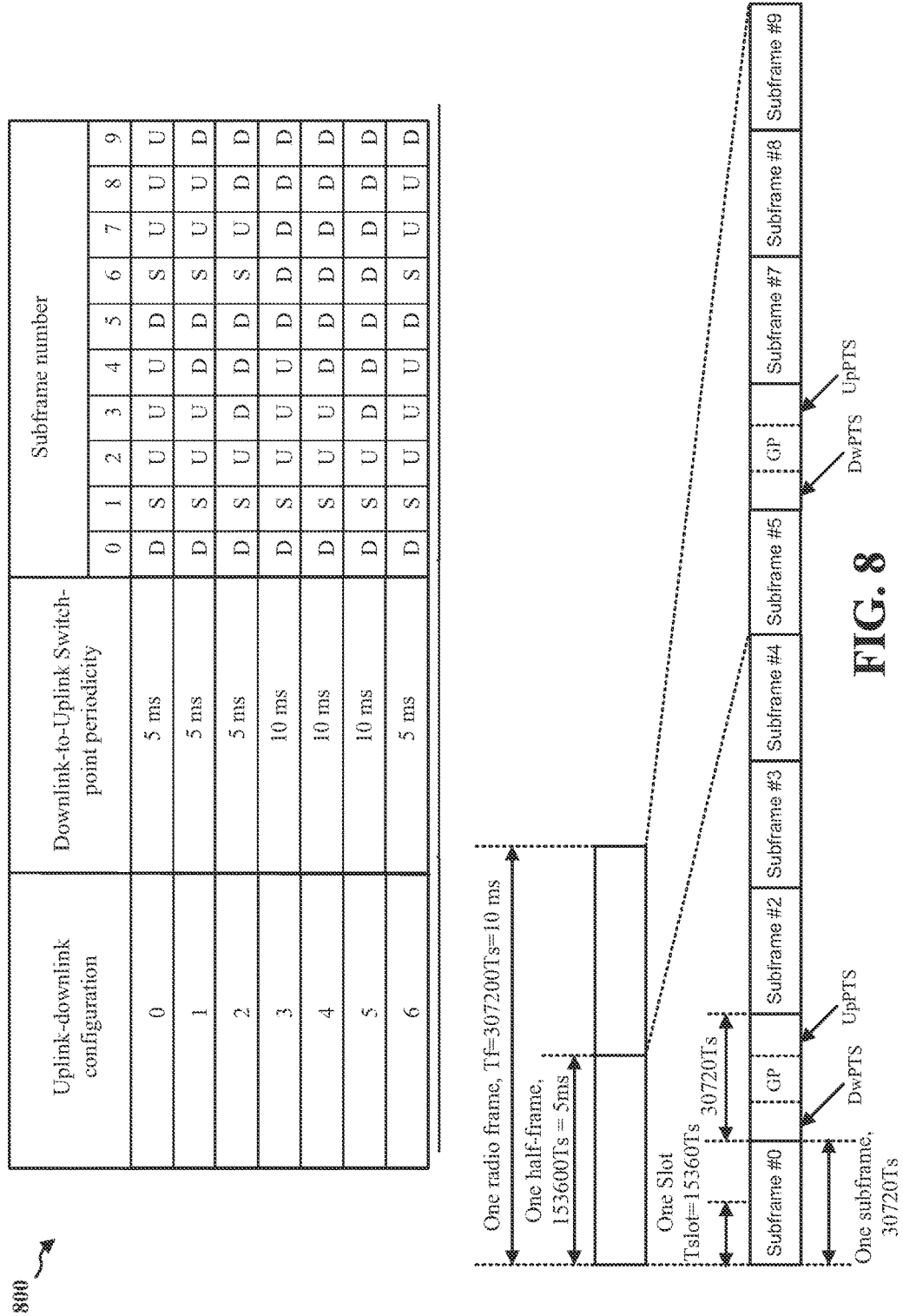
FIG. 8 is a diagram illustrating possible DL/UL configurations and special subframes.

FIG. 8 is a diagram 800 illustrating possible DL/UL configurations and special subframes. In LTE, both FDD and TDD frame structures are supported. For TDD, seven possible DL/UL subframe configurations (0 through 6) are supported. There are two different switching periodicities, 5 ms and 10 ms. For a 5 ms switching periodicity, there are two special subframes in one frame (10 ms). For a 10 ms switching periodicity, there is one special subframe in one frame. A TDD UL/DL frame structure with a 5 ms switching periodicity is illustrated in FIG. 8.

The TDD DL/UL subframe configuration may be dynamically adapted based on actual traffic needs. Such an adaptation based on traffic needs may be referred to as enhanced interference management and traffic adaptation (eIMTA) (sometimes also referred to as enhanced interference mitigation and traffic adaptation). For example, if during a short duration, a large data burst on DL is needed, the DL/UL configuration can be changed from configuration #1 with 6 DL subframes and 4 UL subframes to configuration #5 with 9 DL subframes and 1 UL subframe. The adaptation of the TDD configuration may be no slower than 640 ms. In an extreme case, the adaptation of the TDD configuration can be as fast as 10 ms. Such an adaptation may cause overwhelming interference to DL and/or UL of two or more adjacent cells when the two or more adjacent cells have different DL/UL subframes. The dynamic indication of the TDD DL/UL subframe configuration may be sent to a UE through explicit layer 1 signaling through a UE-group-common physical downlink control channel (PDCCH) or an evolved PDCCH ePDCCH.

The adaptation may also cause additional complexity in DL/UL HARQ management. To simplify HARQ management, a reference DL/UL subframe configuration may be used. In particular, for UL HARQ, scheduling and HARQ timing may be based on the DL/UL subframe configuration as indicated in the system information block (SIB) SIB 1 (SIB1). For DL HARQ, a UE may be indicated to use one reference configuration taken from configurations #2, #4, and #5. The reference configuration may be semi-statically configured. In eIMTA, some subframes may not be subject to dynamic change of transmission directions, while some subframes may be subject to dynamic adaptations. In one configuration, DL subframes in the TDD DL/UL subframe configuration in the SIB1 may not be subject to dynamic adaptation, and UL subframes in the DL HARQ reference configuration may not be subject to dynamic adaptation.

Both periodic and aperiodic CSI feedback may be supported. For a UE configured with transmission mode (TM) 1 to 9, a UE may derive a CSI reporting based on the CSI reference resource. For periodic CSI reporting, the reference resource may be the latest valid DL subframe at least four subframes before the reporting uplink subframe. For aperiodic CSI (A-CSI) reporting, the reference resource may be in the same valid DL subframe as the corresponding CSI request in an UL DL control information (DCI) format. That is, in A-CSI reporting, the reference resource may be the same DL subframe in which the CSI request is received. For a UE configured with transmission mode 10, each CSI process may be associated with a non-zero power (NZP) CSI reference signal (RS) (NZP-CSI-RS) and CSI interference measurement (IM) (CSI-IM). The reference resource may be defined by a valid DL subframe containing the configured NZP-CSI-RS and/or CSI-IM resources. In case of enhanced inter-cell interference coordination (eICIC) operation, a UE may be configured with two subframe measurement sets. In such a configuration, the reference resource for CSI reporting may be further restricted by the subframe set, for example, an element of the configured subframe set.

An eIMTA UE may be configured with two CSI subframe sets by higher layer RRC signaling corresponding to different interference scenarios. For example, a first CSI subframe set may include subframes with DL-to-DL interference, and a second CSI subframe set may include subframes with both DL-to-DL interference and UL-to-DL interference. That is, for a cell, a first CSI subframe set may include DL subframes that receive interference from DL subframes of a neighboring cell, and a second CSI subframe set may include DL subframes that receive interference from both DL subframes of the neighboring cell and UL subframes of the neighboring cell. A 10-bit bitmap may index/indicate the subframes for the first and second CSI subframe sets, with a "0" indicating the subframe corresponds to the first subframe set, and a "1" indicating the subframe corresponds to the second CSI subframe set. Aperiodic CSI feedback may be supported for all the configured CSI subframe sets. For A-CSI reporting for a single serving cell, CSI for only one subframe set may be supported in any subframe. The CSI subframe set for A-CSI reporting may be determined by a two-bit dynamic indicator in an UL DCI format transmitted in a UE-specific search space.

One issue includes how to determine the reference resource for A-CSI reporting when the triggered CSI subframe set is different from the CSI reporting subframe set. For example, an A-CSI request/trigger may be received in a subframe of a first CSI subframe set and the request may be for a CSI reporting of a subframe in a second CSI subframe set. For TM 1 to 9, interference measurements may be based on CRS, which is available in every valid DL subframe. Another issue includes whether a UE should be required to measure one subframe before the A-CSI request subframe for A-CSI reporting.

In a first approach, the CSI reference resource may be the valid DL subframe in the latest subframe no later than subframe n−4 and corresponding to the triggered CSI subframe set, where the A-CSI is reported in subframe n. The first approach may require the UE to measure and to store CSI samples in every valid DL subframe before the triggering subframe. Such an approach may cause extra complexity and unnecessary power consumption to the UE. In a second approach, the CSI reference resource may be the valid DL subframe in the latest subframe no later than subframe n−4 and no earlier than the subframe containing the A-CSI request/trigger, and corresponding to the triggered CSI subframe set, where the A-CSI is reported in subframe n. The second approach may allow the UE to measure for A-CSI after receiving the trigger, but in some cases, there may be no valid reference resource between the A-CSI request/trigger and the reporting subframe.

Figure 9:
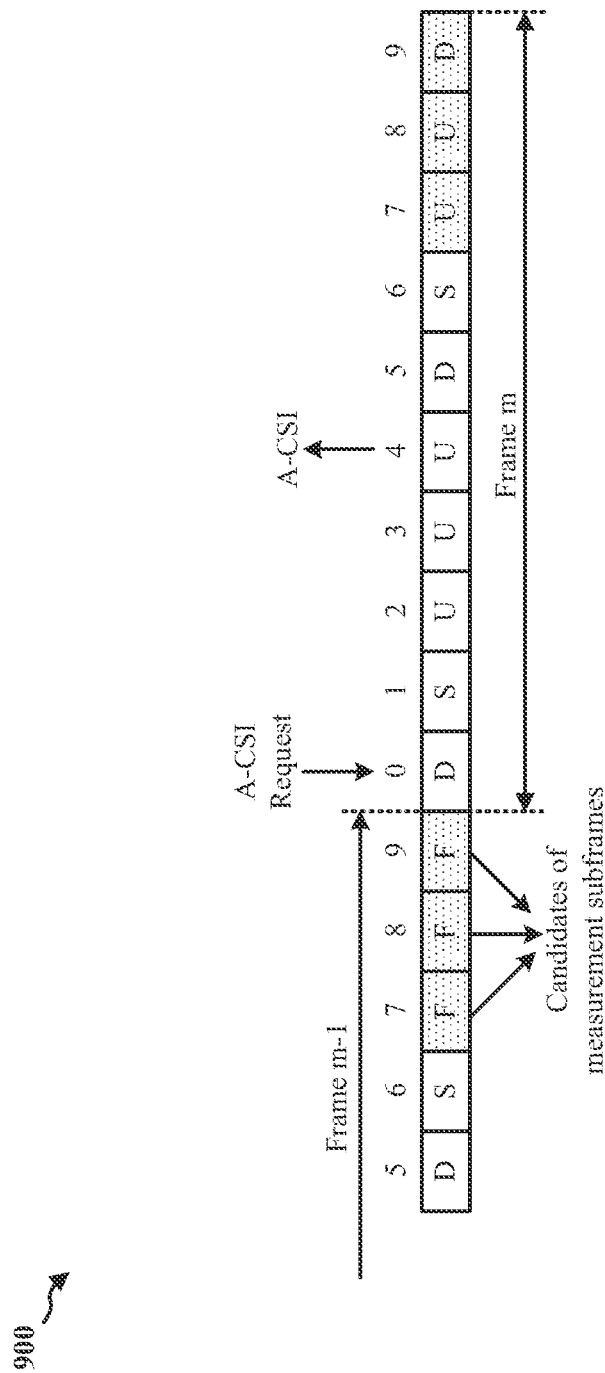
FIG. 9 is a diagram illustrating first and second approaches for the CSI reference resource for aperiodic CSI reporting.

FIG. 9 is a diagram 900 illustrating first and second approaches for the CSI reference resource tor A-CSI. reporting. Assume that subframes 0-6 are in a first CSI subframe set, and that subframes 7-9 are in a second CSI subframe set (referred to as flexible subframes in FIG. 9). Assume also that an A-CSI request is received in subframe #0 of frame m for A-CSI reporting of flexible DL subframes in subframe #4 of frame m. That is, an A-CSI request is received in subframe #0 of frame m of the first CSI subframe set for A-CSI reporting of a DL subframe in the second CSI subframe set. The A-CSI reporting of a DL subframe in the second CSI subframe set is made in subframe #4 of frame m. In approach 1, the CSI reference subframe is subframe #9 of frame m−1 (the last (and only) DL subframe of the second CSI subframe set before the A-CSI request/trigger). Accordingly, in approach 1, the UE implements blind storing of CSI samples before an A-CSI request/trigger is received. In approach 2, there is no DL subframe of the second CSI subframe set that is after subframe #0 of frame m and on or before subframe n−4, where n is subframe #4 of frame m. Accordingly, in approach 2, the UE does not report A-CSI of a flexible DL subframe.

Figure 10:
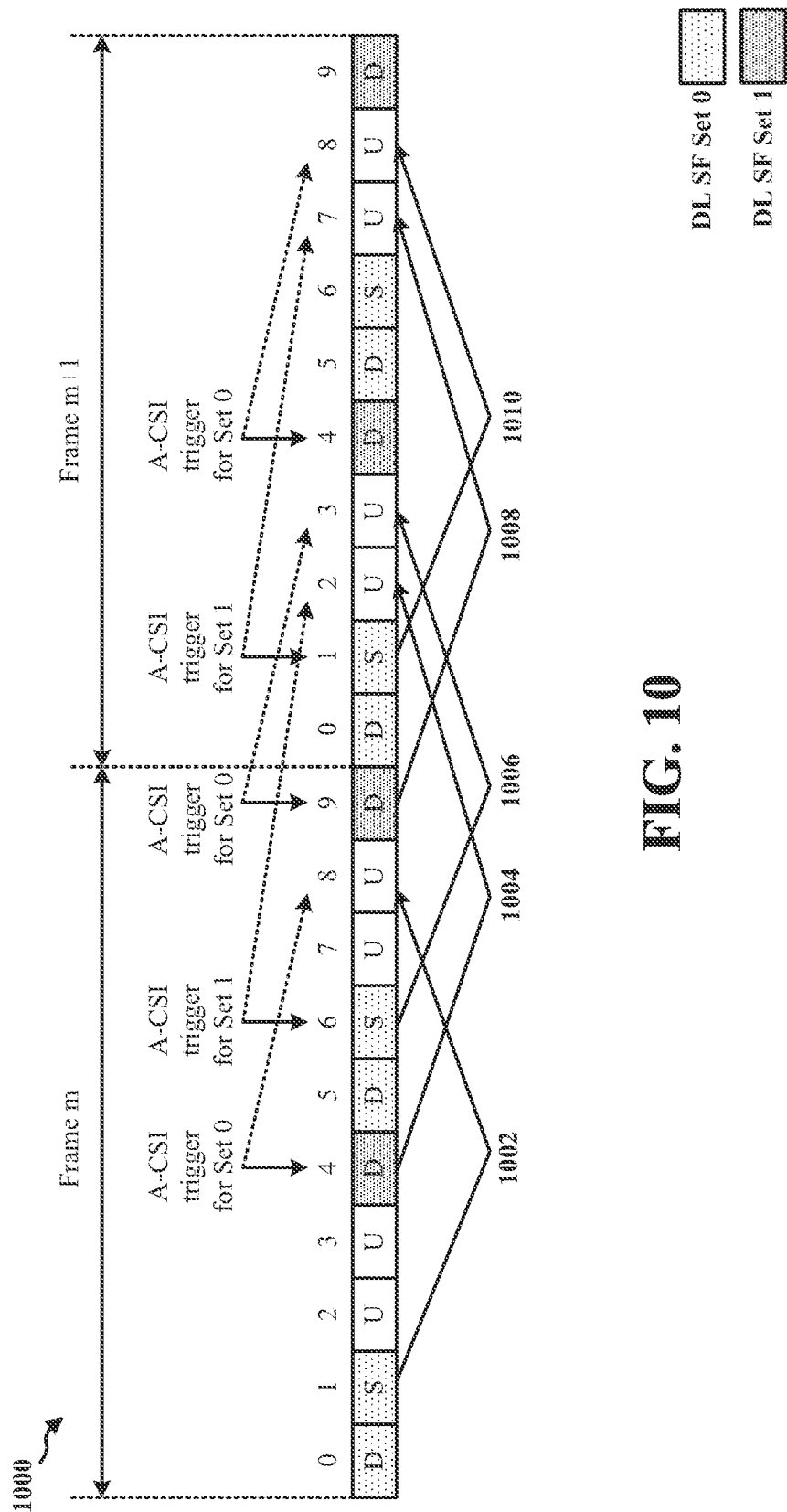
FIG. 10 is a first diagram illustrating the first approach for the CSI reference resource for aperiodic CSI reporting.

FIG. 10 is a first diagram 1000 illustrating the first approach for the CSI reference resource for A-CSI reporting. The complexity to implement blind storing of CSI measurement samples is dependent on the configuration of the CSI subframe set. If the A-CSI triggering subframes according to the configured UL HARQ timing are defined in the same CSI subframe set, then the blind storing operation may need to be performed at most once every 5 ms. If the A-CSI triggering subframes are divided into two different CSI subframe sets, then the UE may be required to buffer the CSI samples for two DL subframes every 5 ms. For example, referring to FIG. 10, assume that the TDD DL/UL configuration #1 is indicated by the SIB1 and that the A-CSI triggering subframes are subframes #'s 1, 4, 6, and 9. Assume also that a first subframe set (Set 0) includes subframes #'s 0, 1, 5, and 6, and that a second subframe set (Set 1) includes subframes #'s 4 and 9. In FIG. 10, the UE stores CSI measurement samples from DL subframes #'s 1, 4, 6, and 9. In response to an A-CSI request/trigger received in subframe #4 of frame m (which is a subframe in the second CSI subframe set) for a CSI measurement associated with the first CSI subframe set, the UE reports the A-CSI measurement from DL subframe #1 of frame m in UL subframe #8 of frame m (1002). In response to an A-CSI request/trigger received in subframe #6 of frame m (which is a subframe in the first CSI subframe set) for a CSI measurement associated with the second CSI subframe set, the UE reports the A-CSI measurement from DL subframe #4 of frame m in UL subframe #2 of frame m+1 (1004). In response to an A-CSI request/trigger received in subframe #9 of frame m (which is a subframe in the second CSI subframe set) for a CSI measurement associated with the first CSI subframe set, the UE reports the A-CSI measurement from DL subframe #6 of frame m in UL subframe #3 of frame m+1 (1006). In response to an A-CSI request/trigger received in subframe #1 of frame m+1 (which is a subframe in the first CSI subframe set) for a CSI measurement associated with the second CSI subframe set, the UE reports the A-CSI measurement from DL subframe #9 of frame m subframe #7 of frame m+1 (1008). In response to an A-CSI request/trigger received in subframe #4 of frame m+1 (which is a subframe in the second CSI subframe set) for a CSI measurement associated with the first CSI subframe set, the UE reports the A-CSI measurement from DL subframe #1 of frame m+1 in UL subframe #8 of frame m+1 (1010).

Figure 11:
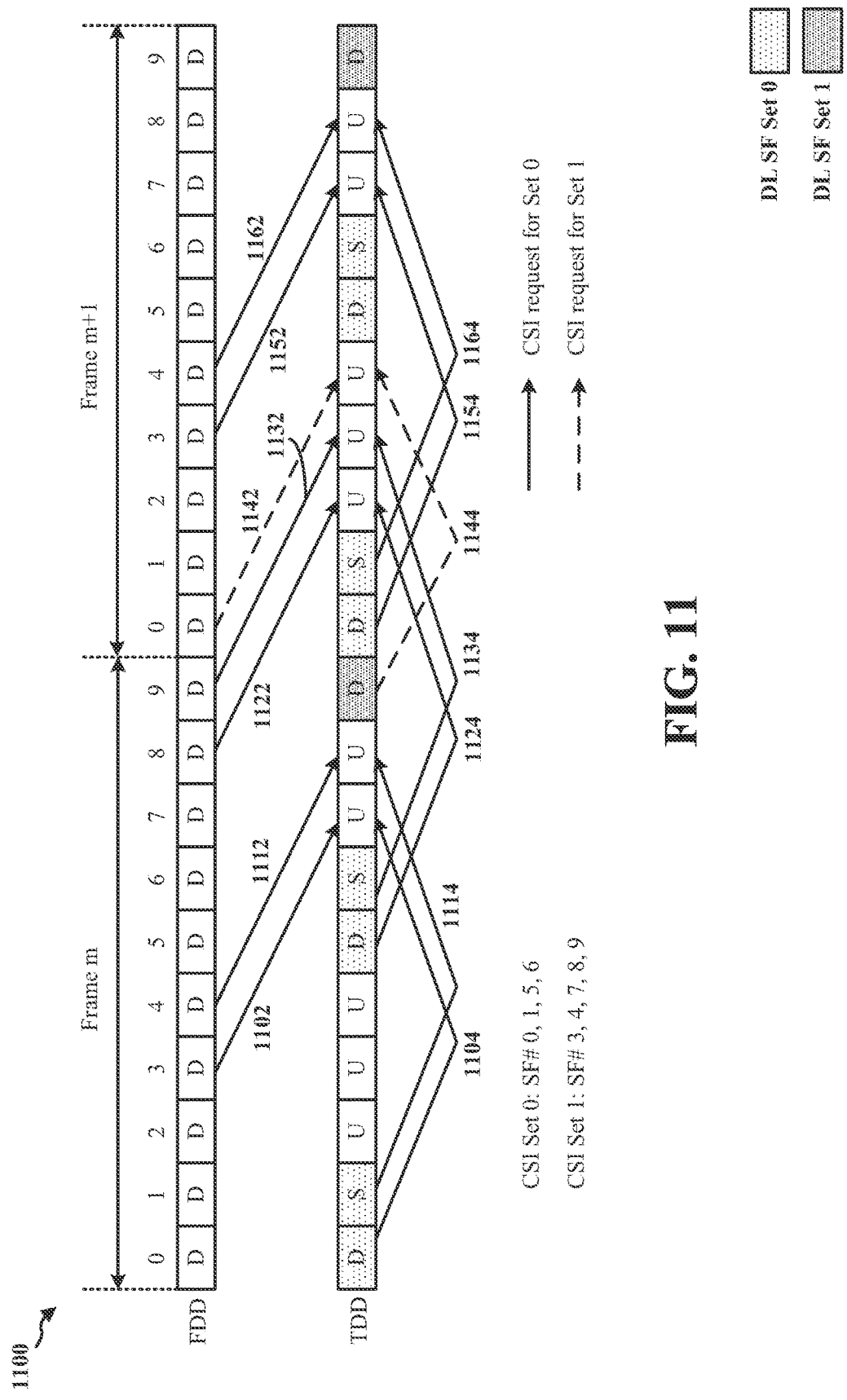
FIG. 11 is a second diagram illustrating the first approach for the CSI reference resource for aperiodic CSI reporting.

FIG. 11 is a second diagram 1100 illustrating the first approach for the CSI reference resource for A-CSI reporting. The complexity is further increased for UL CA (e.g., for TDD-TDD or FDD-TDD) because the A-CSI triggering for an eIMTA. Scell may come from a Pcell and/or an Scell. As a result, a UE may need to buffer more than two subframes every 5 ms. For example, referring to FIG. 11, A-CSI triggering for the eIMTA TDD Scell comes from the FDD Pcell. The UE buffers CSI measurements in every valid DL subframe in the eIMTA Scell. Specifically, the UE buffers CSI measurements in subframes #0, #1, #5, #6, and #9 of the TDD Scell. In subframe #3 of frame m, the UE receives an CSI request/trigger for the first CSI subframe set (Set 0) in the Pcell. In response to the received A-CSI request/trigger, the UE reports (1102) the CSI measurements that were buffered in subframe #0 of frame m of the TDD Scell in the UL subframe #7 of frame m of the TDD Scell (1104). In subframe #4 of frame m, the UE receives an A-CSI request/trigger for the first CSI subframe set (Set 0) in the Pcell. In response to the received A-CSI request/trigger, the UE reports (1112) the CSI measurements that were buffered in subframe #1 of frame m of the TDD Scell in the UL subframe #8 of frame m of the TDD Scell (1114). In subframe #8 of frame m, the UE receives an A-CSI request/trigger for the first CSI subframe set (Set 0) in the Pcell. In response to the received A-CSI request/trigger, the UE reports (1122) the CSI measurements that were buffered in subframe #5 of frame m of the TDD Scell in the UL subframe #2 of frame m+1 of the TDD Scell (1124). In subframe #9 of frame m, the UE receives an A-CSI request/trigger for the first CSI subframe set (Set 0) in the Pcell. In response to the received A-CSI request/trigger, the UE reports (1132) the CSI measurements that were buffered in subframe #6 of frame m of the TDD Scell in the UL subframe #3 of frame m+1 of the TDD Scell (1134). In subframe #0 of frame m+1, the UE receives an A-CSI request/trigger for the second CSI subframe set (Set 1) in the Pcell. In response to the received A-CSI request/trigger, the UE reports (1142) the CSI measurements that were buffered in subframe #9 of frame m of the TDD Scell in the UL subframe #4 of frame m+1 of the TDD Scell (1144). In subframe #3 of frame m+1, the UE receives an A-CSI request/trigger for the first CSI subframe set (Set 0) in the Pcell. In response to the received A-CSI request/trigger, the UE reports (1152) the CSI measurements that were buffered in subframe #0 of frame m+1 of the TDD Scell in the UL subframe #7 of frame m+1 of the TDD Scell (1154). In subframe #4 of frame m+1, the UE receives an A-CSI request/trigger the first CSI subframe set (Set 0) in the Pcell. In response to the received A-CSI request/trigger, the UE reports (1162) the CSI measurements that were buffered in subframe #1 of frame m+1 of the TDD Scell in the UL subframe #8 of frame m+1 of the TDD Scell (1164).

The aforementioned first approach may require the UE to measure and to store CSI samples in every valid DL subframe before the triggering subframe. Such an approach may cause extra complexity and unnecessary power consumption to the UE. The aforementioned second approach may allow the UE to measure for A-CSI after receiving the trigger, but in some cases, there may be no valid reference resource between the A-CSI request/trigger and the reporting subframe. Accordingly, additional exemplary approaches are provided infra.

Figure 12:
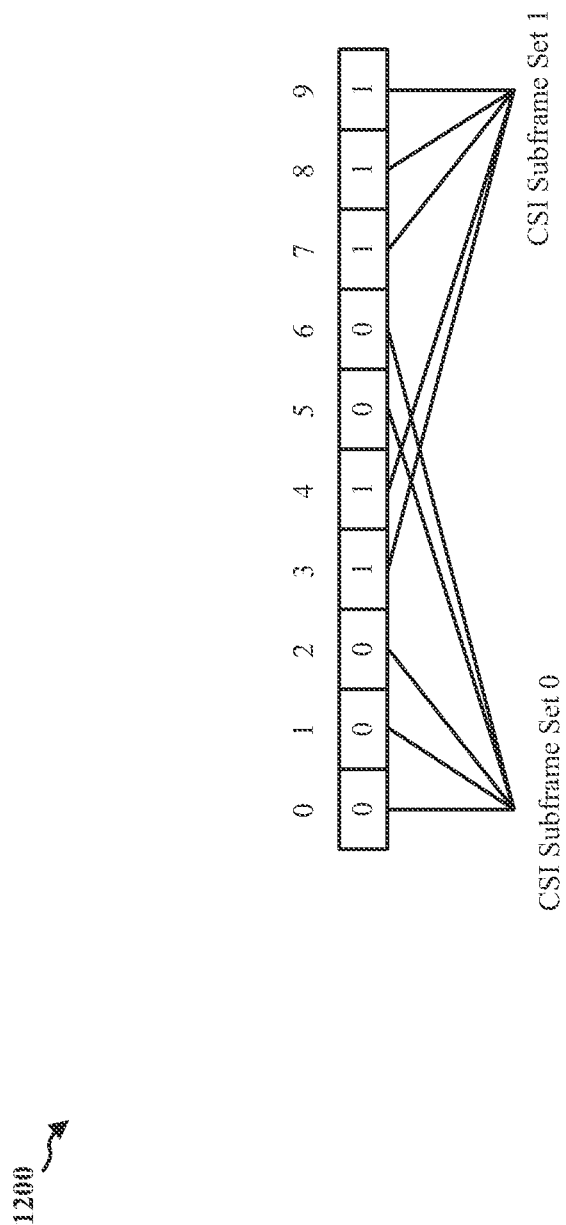
FIG. 12 is a diagram illustrating a first alternative approach for the CSI reference resource for aperiodic CSI reporting.

FIG. 12 is a diagram 1200 illustrating a first alternative approach for the CSI reference resource for A-CSI reporting. In the first alternative approach, a UE may be required to implement blind storing of CSI samples only for semi-statically configured reference subframes. For example, when a CSI subframe set is configured, one of the associated subframes may be indicated as a semi-static reference subframe for blind CSI measurement. If there is no valid reference subframe between the A-CSI triggering subframe and the CSI reporting subframe, subframe n, that is on or before subframe n−4, the UE may report the pre-stored CSI of the semi-static reference subframe. Otherwise, the CSI reporting may be based on a valid reference subframe between the A-CSI triggering subframe and the CSI reporting subframe.

The CSI reference subframe can be determined either via dedicated signaling or implicitly derived on a per case basis. As an example for the implicit derivation, the CSI reference subframe can be the first available DL subframe of the configuration of a subframe set, for example, the first DL subframe in a frame with bit indexing of a "0" or "1." Specifically, the CSI reference subframe may be the lowest indexed DL subframe in the corresponding subframe set prior to the triggering subframe if there is no valid DL CSI reference resource between the A-CSI triggering subframe and the subframe n−4. In addition, the CSI reference subframe can be separately indicated or derived per subframe set. If the configuration of the CSI subframe set contains only one DL subframe, then that DL subframe may be determined as the semi-statically configured reference subframe for A-CSI reporting.

Referring to FIG. 12, subframe #'s 0, 1, 2, 5, and 6 may be in a first CSI subframe set (Set 0), and subframe #'s 3, 4, 7, 8, and 9 may be in a second CSI subframe set (Set 1). Subframes in the first CSI subframe set may be indicated to a UE as being within the first CSI subframe set through indexing of a "0," and subframes in the second CSI subframe set may be indicated to a UE as being within the second CSI subframe set through indexing of a "1." In the first alternative approach, a UE may receive an explicit configuration (through dedicated signaling) of the CSI reference subframe in one or more of the first and second CSI subframe sets. Alternatively, a UE may implicitly determine the CSI reference subframe to be the first DL subframe in the CSI subframe set. For example, for TDD DL/UL configurations #2 and #5, a UE may determine that subframe #0 is the CSI reference subframe for the first CSI subframe set, and that subframe #3 is the CSI reference subframe for the second CSI subframe set. For another example, for TDD DL/UL configurations #1 and #4, a UE may determine that subframe #0 is the CSI reference subframe for the first CSI subframe set, and that subframe #4 is the CSI reference subframe for the second CSI subframe set. For yet another example, for TDD DL/UL configuration #3, a UE may determine that subframe #0 is the CSI reference subframe for the first CSI subframe set, and that subframe #7 is the CSI reference subframe for the second CSI subframe set; and for TDD DL/UL configuration #6, a UE may determine that subframe #0 is the CSI reference subframe for the first CSI subframe set, and that subframe #9 is the CSI reference subframe for the second CSI subframe set.

Figure 13:
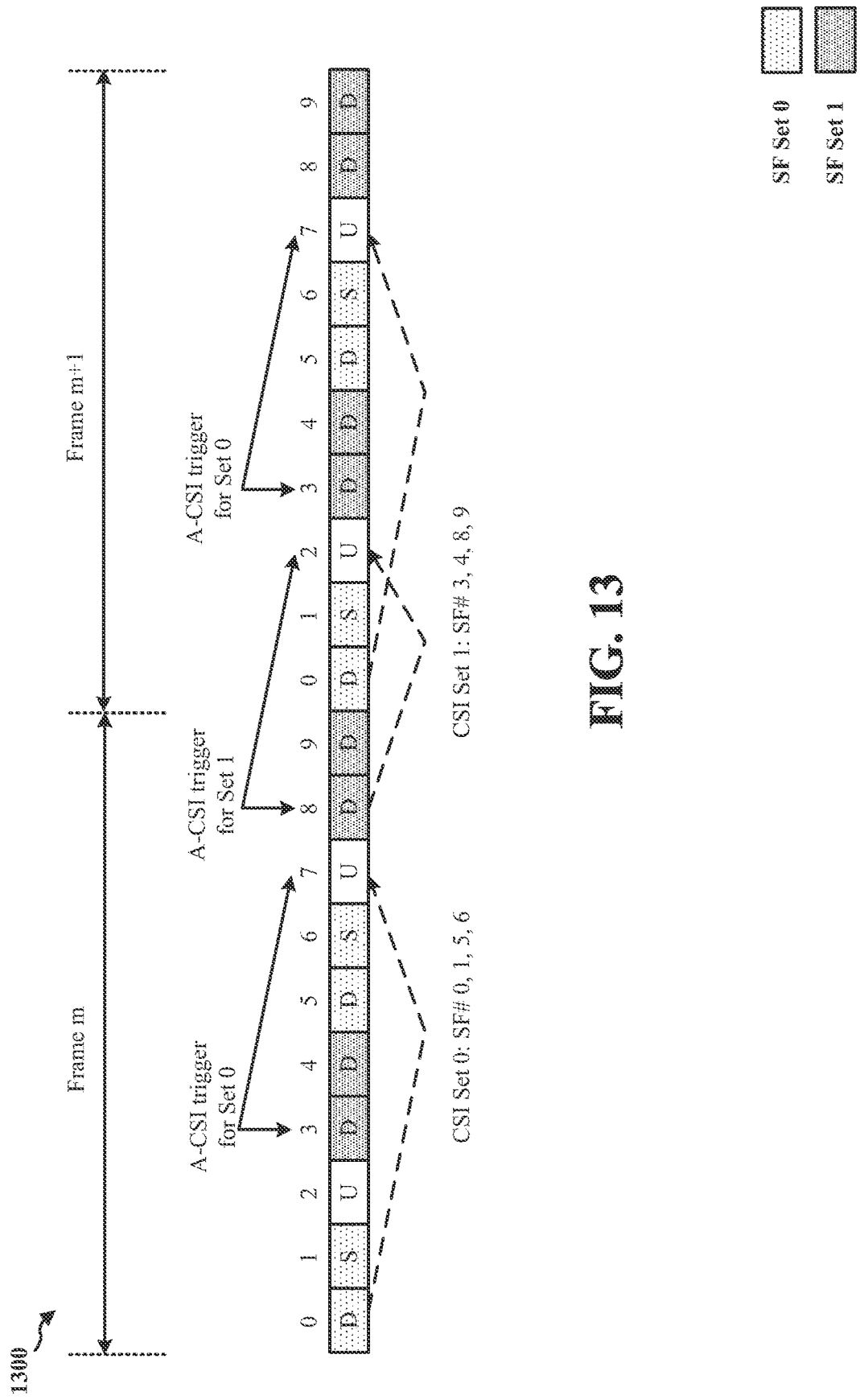
FIG. 13 is a diagram illustrating a second alternative approach for the CSI reference resource for aperiodic CSI reporting.

FIG. 13 is a diagram 1300 illustrating a second alternative approach for the CSI reference resource for A-CSI reporting. In the second alternative approach, approach 1 may be restricted to one CSI subframe set for TDD eIMTA based on the configuration of the CSI subframe set. For example, if A-CSI triggering subframes are spread into two CSI subframe sets, blind storing/buffering may be applied to only one of the CSI subframe sets. The determination of the CSI subframe set for which blind storing/buffering is applied may be indicated either via dedicated signaling or implicitly derived. As an example of the implicit derivation, assume a first CSI subframe set includes subframe #'s 0, 1, 5, and 6, and a second CSI subframe set includes subframe #'s 2, 3, 4, 7, 8, and 9. The CSI subframe set on which the blind storing/buffering is applied may be dependent on TDD DL/UL subframe configurations of the eIMTA cell. In a first example, for TDD UL/DL configurations 0, 1, 3, and 6, the CSI subframe set on which the blind storing/buffering is applied may be the CSI subframe set that does not include DL subframes #'s 0, 1, 5, and 6 (i.e., the second CSI subframe set (Set 1)). However, in a second example, for TDD UL/DL configurations 2, 4, and 5, the CSI subframe set on which blind storing/buffering is applied may by the CSI subframe set that includes the DI, subframes #'s 0, 1, 5, and 6 (i.e., the first CSI subframe set (Set 0)). The second alternative approach may provide the maximum flexibility and trade-off between performance and complexity, as the blind storing/buffering of CSI measurement samples is performed in only one valid DL subframe every 5 ms.

For example, referring to FIG. 13, assume subframe #'s 0, 1, 5, and 6 are in a first CSI subframe set (Set 0), and subframe #'s 3, 4, 8, and 9 are in a second CSI subframe set (Set 1). For TDD UL/DL configuration 2, blind storing/buffering is applied to the first CSI subframe set (Set 0), as the first CSI subframe set includes subframes #'s 0, 1, 5, and 6. Accordingly, a UE may store/buffer CSI measurement samples from subframe #0 (e.g., first available DI, subframe/lowest indexed DL subframe), and in response to an A-CSI request/trigger for the first CSI subframe set (Set 0) received in subframe #3 of the second CSI subframe set, the UE may report the stored/buffered CSI measurement samples in the subsequent subframe #7. However, the UE may not store/buffer CSI measurement samples for the second CSI subframe set because A-CSI requests/triggers for the second CSI subframe set may be received in DL subframes on the second CSI subframe set. In response to an A-CSI request/trigger for the second CSI subframe set (Set 1) received in subframe #8, the UE may determine the CSI based on reference signals in the subframe #8 and report the CSI measurement results in the subsequent UL subframe #2. Accordingly, in this example, blind storing/buffering is applied only to the first CSI subframe set (Set 0). Further, because the A-CSI request/trigger for the second CSI subframe set (Set 1) is always in the second CSI subframe set, there is no need to buffer CSI measurement results for the second CSI subframe set.

Figure 14:
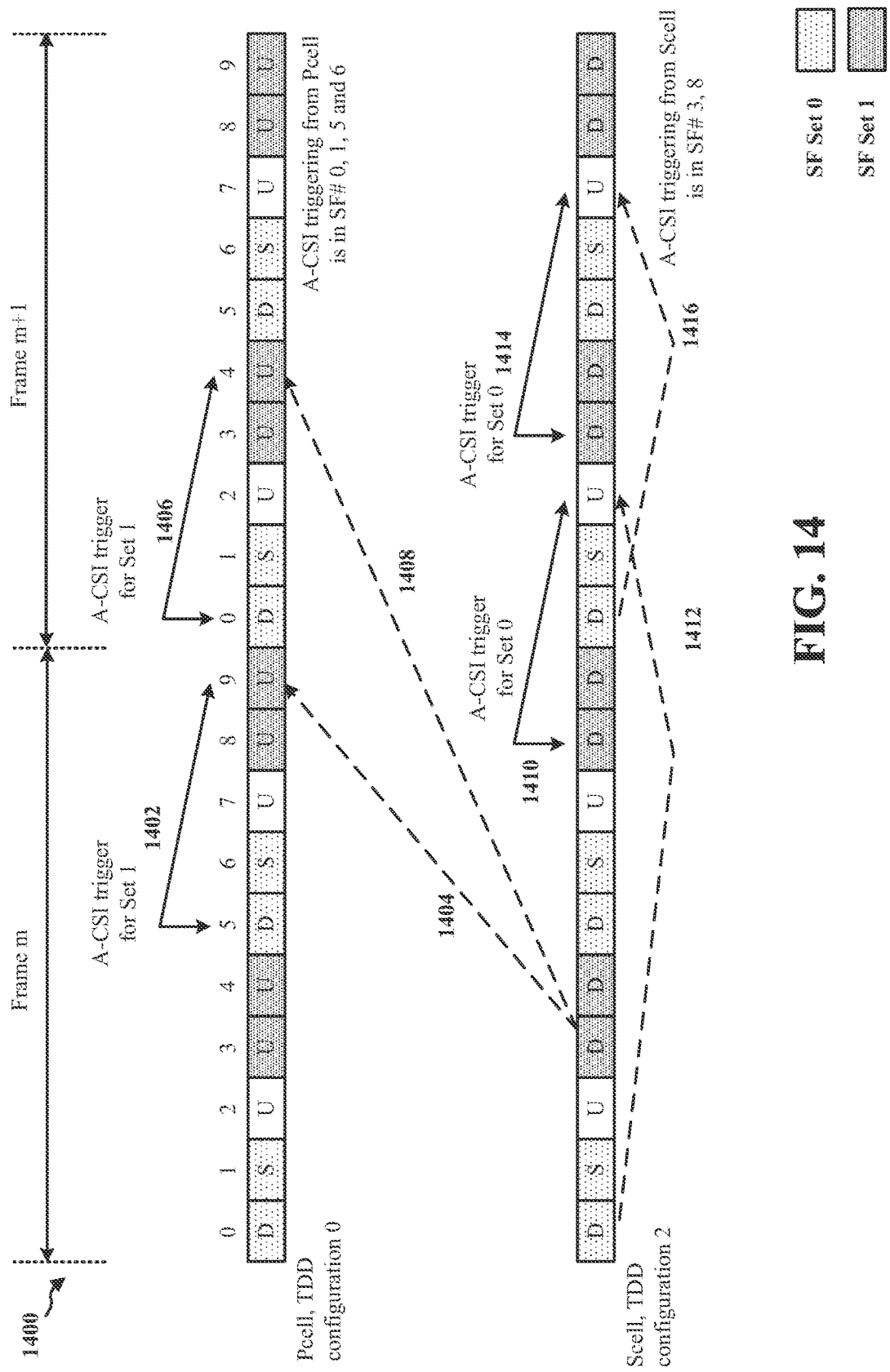
FIG. 14 is a second diagram illustrating the second alternative approach for the CSI reference resource for aperiodic CSI reporting.

FIG. 14 is a second diagram 1400 illustrating the second alternative approach for the CSI reference resource for A-CSI reporting. In case of UL-CA, A-CSI triggering for an eIMTA Scell may come from a Pcell and/or an Scell. With approach 1, a UE needs to buffer CSI for both the first and second CSI subsets. However, in the second alternative approach, the UE only needs to buffer for one CSI subframe set for each carrier based on the Pcell. TDD UL/DL configuration. For example, referring to FIG. 14, a UE receives an A-CSI trigger 1402 on the Pcell for a second subframe set (Set 1) in frame m within subframe #5, which is in a first subframe set (Set 0). The UE previously buffered CSI for DL subframe #4 of frame m on the Scell, as the DL subframe #4 is the first available DL subframe/lowest indexed DL subframe within subframe in for the second subframe set (Set 1). The UE reports 1404 the buffered CSI in subframe #9. In addition, the UE receives an A-CSI trigger 1406 on the Pcell for the second subframe set (Set 1) in frame m+1 within subframe #0, which is in the first subframe set (Set 0). The UE previously buffered CSI for DL subframe #4 on the Scell, as the DL subframe #4 is the first available DL subframe/lowest indexed DL subframe within subframe in for the second subframe set (Set 1). The UE reports 1408 the buffered CSI in subframe #4. Further, the UE receives an A-CSI trigger 1410 on the Scell for the first subframe set (Set 0) in frame m within subframe #8, which is in the second subframe set (Set 1). The UE previously buffered CSI for DL subframe #0 on the Scell, as the DL subframe #0 is the first available DL subframe/lowest indexed DL subframe within subframe m for the first subframe set (Set 0). The UE reports 1412 the buffered CSI in subframe #2. Further, the UE receives an A-CSI trigger 1414 on the Scell for the first subframe set (Set 0) within subframe #3, which is in the second subframe set (Set 1). The UE previously buffered CSI for DL subframe #0 on the Scell, as the DL subframe #0 is the first available DL subframe/lowest indexed DL subframe within subframe m+1 for the first subframe set (Set 0). The UE reports 1416 the buffered CSI in subframe #7. As a result, the UE needs to buffer CSI measurement samples in subframes #'s 0 and 4 of the Scell for CSI reporting.

In a third alternative approach, for CA versus non-CA, different approaches may be adopted. For example, for non-CA, approach 1 (FIGS. 9, 10, 11) may be adopted, while for CA, approach 2 (see discussion in relation to FIG. 9) may be adopted. In another example, approach 1 (FIGS. 9, 10, 11) may be adopted for some component carriers but approach 2 may be adopted for other component carriers for CA, Equivalently or more generally, the use of approach 1 or approach 2 or any variants (e.g., first alternative approach (FIG. 12) and the second alternative approach (FIGS. 13, 14)) can be tied to RRC configurations (CA versus non-CA, etc.) and/or UE capability. The first alternative approach may be preferable because a UE is required to measure the CSI reference subframe once every 10 ms. The second alternative approach may also be acceptable because the UE complexity is reduced compared to approach 1, but the UE is still required to buffer the dynamic CSI measurement samples once every 5 ms.

Figure 15:
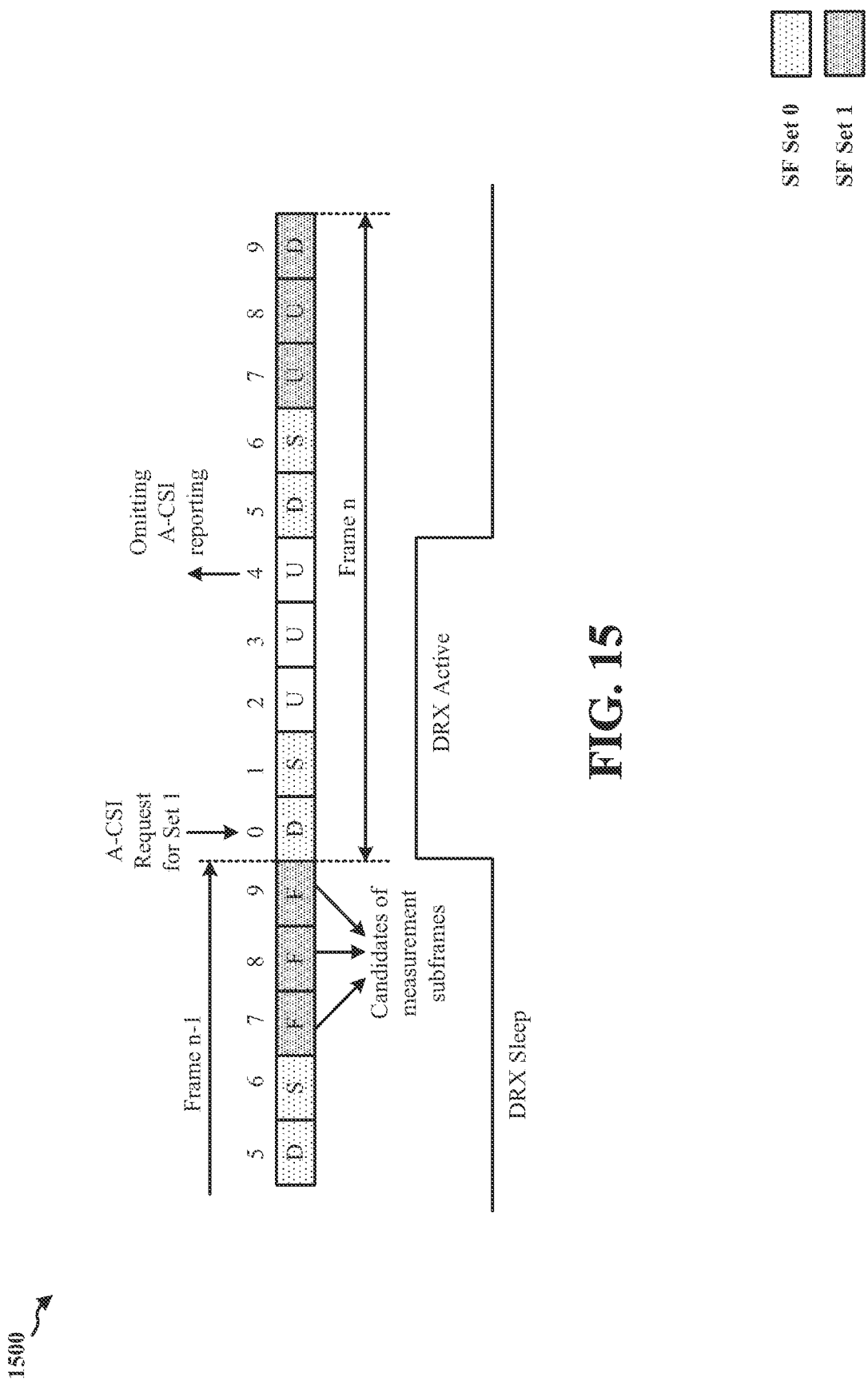
FIG. 15 is a diagram illustrating a fourth alternative approach for the CSI reference resource for aperiodic CSI reporting.

FIG. 15 is a diagram 1500 illustrating a fourth alternative approach for the CSI reference resource for A-CSI reporting. For eIMTA, a UE may be configured with connected mode discontinuous reception CDRX. In such a configuration, a UE may not be required to pre-wake up for blind CSI measurements. If an A-CSI request is received during a discontinuous reception (DRX) active mode/state with the valid CSI reference resource earlier than the triggering subframe and falling in a DRX sleep mode/state, the UE may be allowed to omit the A-CSI reporting. For example, referring to FIG. 15, an A-CSI request/trigger is received during a DRX active mode in subframe #0 of frame n. The valid CSI reference subframe is subframe #9 of frame n−1. However, the UE was in a DRX sleep mode at that time, and therefore omits the A-CSI reporting in subframe #4 of frame n.

Figure 16:
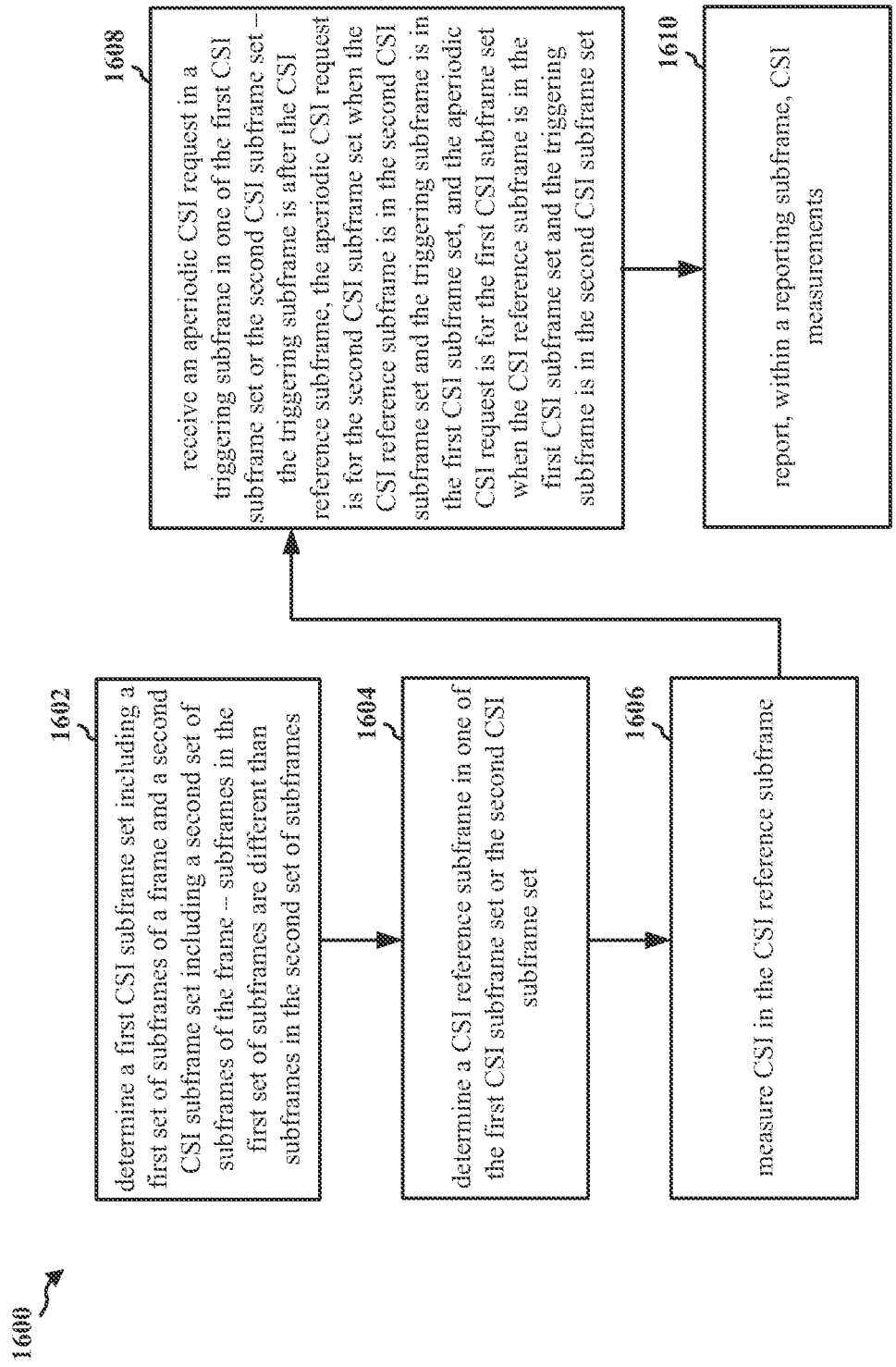
FIG. 16 is a flowchart illustrating the first alternative approach.

FIG. 16 is a flowchart 1600 illustrating the first alternative approach. The method may be performed by a UE, such as the UE 102, 206, 650. At 1602, the UE determines a first CSI subframe set including a first set of subframes of a frame and a second CSI subframe set including a second set of subframes of the frame. For example, the first CSI subframe set may be one of Set 0 or Set 1, and the second CSI subframe set may be the other of Set 0 or Set 1. As discussed supra, subframes in the first set of subframes (first CSI subframe set) are different than subframes in the second set of subframes (second CSI subframe set). At 1604, the UE determines a CSI reference subframe in one of the first CSI subframe set or the second CSI subframe set. The UE may receive information indicating the CSI reference subframe and/or may determine the CSI reference subframe implicitly. For example, the UR may receive a semi-static configuration of the CSI reference subframe through RRC signaling. For another example, the UE may implicitly determine that the first DL subframe in the first CSI subframe set and/or the second CSI subframe set is a CSI reference subframe, For example, referring to FIG. 10, the UE may implicitly determine subframe #1 and #4 as the CSI reference subframe of the first and second subframe set. For another example, referring to FIG. 14, the UE may implicitly determine subframe #0 and #3 as the CSI reference subframe of the first and second subframe set.

At 1606, the UE measures CSI in the CSI reference subframe. The UE may store/buffer the measured CSI for later reporting upon receiving an aperiodic CSI request/trigger in a triggering subframe.

At 1608, the UE receives an aperiodic CSI request in a triggering subframe in one of the first CSI subframe set or the second CSI subframe set. The triggering subframe is after the CSI reference subframe. The aperiodic CSI request is for the second CSI subframe set when the CSI reference subframe is in the second CSI subframe set and the triggering subframe is in the first CSI subframe set, and the aperiodic CSI request is for the first CSI subframe set when the CSI reference subframe is in the first CSI subframe set and the triggering subframe is in the second CSI subframe set. For example, referring to FIG. 10, a UE receives an aperiodic CSI request in a triggering subframe #4 of frame m in a Set 1. The triggering subframe is after the CSI reference subframe #1 of frame m. The aperiodic CSI request is for the Set 0 when the CSI reference subframe is in the Set 0 and the triggering subframe is in the Set 1. For another example, referring to FIG. 10, a UE receives an aperiodic CSI request in a triggering subframe #6 of frame m in a Set 0. The triggering subframe is after the CSI reference subframe #4 of frame m. The aperiodic CSI request is for the Set 1 when the CSI reference subframe is in the Set 1 and the triggering subframe is in the Set 0. For yet another example, referring to FIG. 13, a UE receives an aperiodic CSI request in a triggering subframe #3 of frame m in a Set 1. The triggering subframe is after the CSI reference subframe #0 of frame m. The aperiodic CSI request is for the Set 0, as the CSI reference subframe is in the Set 0 and the triggering subframe is in the Set 1.

Assume the CSI reference subframe is in the second CSI subframe set, the triggering subframe is in the first CSI subframe set, and the aperiodic CSI request is received for the second CSI subframe set. In one configuration, the UE determines a reporting subframe in which the aperiodic CSI measurements are to be reported. In addition, the UE determines whether there is a downlink subframe within the second CSI subframe set between the triggering subframe and the reporting subframe. To allow for processing time of the CSI measurements, the triggering subframe may be located at least four subframes before the reporting subframe. Subsequently, the UE measures CSI in the downlink subframe when there is the downlink subframe within the second CSI subframe set between the triggering subframe and the reporting subframe, and the downlink subframe is at least four subframes before the reporting subframe.

For example, referring to FIG. 10, the CSI reference subframe #4 of frame m is in the second CSI subframe set (Set 1), the triggering subframe #6 of frame m is in the first CSI subframe set (Set 0), and the aperiodic CSI request is received for the second CSI subframe set. The UE determines a reporting subframe #2 of frame m+1 in which the aperiodic CSI measurements are to be reported. The triggering subframe #6 of frame m is located at least four subframes before the reporting subframe #2 of frame m+1. The UE determines whether there is a DL subframe within the second CSI subframe set between the triggering subframe #6 of frame m and the reporting subframe #2 of frame m+1 that is at least four subframes before the reporting subframe #2 of frame m+1. Subsequently, the UE, measures CSI in the DL subframe when there is the DL subframe within the second CSI subframe set between the triggering subframe #6 of frame m and the reporting subframe #2 of frame m+1, and the DL subframe is at least four subframes before the reporting subframe #2 of frame m+1. In this case, DL subframe #9 of frame m is between the triggering subframe #6 of frame m and the reporting subframe #2 of frame m+1, but the DL subframe #9 of frame m is only three subframes before the reporting subframe #2 of frame m+1. Accordingly, the UE reports the pre-stored CSI measurements from the CSI reference subframe #4 of frame m in the reporting subframe #2 of frame m+1.

For another example, referring to FIG. 14, the CSI reference subframe #3 of frame m (of Scell) is in the second CSI subframe set (Set 1), the triggering subframe #5 of frame m (of Pcell) is in the first CSI subframe set (Set 0), and the aperiodic CSI request is received for the second CSI subframe set. The UE determines a reporting subframe #9 of frame m (of Pcell) in which the aperiodic CSI measurements are to be reported. The triggering subframe #5 of frame m is located at least four subframes before the reporting subframe #9 of frame m. The UE determines whether there is a DL subframe within the second CSI subframe set between the triggering subframe #5 of frame m and the reporting subframe #9 of frame m that is at least four subframes before the reporting subframe #9 of frame m. Subsequently, the UE measures CSI in the DL subframe when there is the DL subframe within the second CSI subframe set between the triggering subframe #5 of frame m and the reporting subframe #9 of frame m, and the DL subframe is at least four subframes before the reporting subframe #9 of frame m. In this case, there is no DL subframe within the second CSI subframe set between the triggering subframe #5 of frame m and the reporting subframe #9 of frame m that is at least four subframes before the reporting subframe #9 of frame m. Accordingly, the UE reports the pre-stored CSI measurements from the CSI reference subframe #3 of frame m in the reporting subframe #9 of frame m.

For yet another example, referring to FIG. 14, assume the first CSI subframe set is Set 1 and the second CSI subframe set is Set 0. The CSI reference subframe #0 of frame m (of Scell) is in the second CSI subframe set (Set 0), the triggering subframe #8 of frame m (of Scell) is in the first CSI subframe set (Set 1), and the aperiodic CSI request is received for the second CSI subframe set. The UE determines a reporting subframe #2 of frame m+1 (of Scell) in which the aperiodic CSI measurements are to be reported. The triggering subframe #8 of frame m is located at least four subframes before the reporting subframe #2 of frame m+1. The UE determines whether there is a DL subframe within the second CSI subframe set between the triggering subframe #8 of frame m and the reporting subframe #2 of frame m+1 that is at least four subframes before the reporting subframe #2 of frame m+1. Subsequently, the UE measures CSI in the DL subframe when there is the DL subframe within the second CSI subframe set between the triggering subframe #8 of frame m and the reporting subframe #2 of frame m+1, and the DL subframe is at least four subframes before the reporting subframe #2 of frame m+1. In this case, there is no DL subframe within the second CSI subframe set between the triggering subframe #8 of frame m and the reporting subframe #2 of frame m+1 that is at least four subframes before the reporting subframe #2 of frame m+1. Accordingly, the UE reports the pre-stored CSI measurements from the CSI reference subframe #0 of frame m in the reporting subframe #2 of frame m+1.

At 1610, the UE reports, within a reporting subframe, CSI measurements. The UE may report, within the reporting subframe, the CSI measurements from the CSI reference subframe when there is no downlink subframe at least four subframes before the reporting subframe and within the second CSI subframe set between the triggering subframe and the reporting subframe. The UE may report, within the reporting subframe, the CSI measurements from the downlink subframe when there is the downlink subframe at least four subframes before the reporting subframe and within the second CSI subframe set between the triggering subframe and the reporting subframe.

Assume the CSI reference subframe is in the first CSI subframe set, the triggering subframe is in the second CSI subframe set, and the aperiodic CSI request is for the first CSI subframe set. In one configuration, the UE determines a second CSI reference subframe in the second CSI subframe set, measures CSI in the second CSI reference subframe, and receives a second aperiodic CSI request in a second triggering subframe in the first CSI subframe set. The second triggering subframe is after the second CSI reference subframe. The second aperiodic CSI request is for the second CSI subframe set. The CSI reference subframe and the second CSI reference subframe may be the only two CSI reference subframes in the first CSI subframe set and the second CSI subframe set.

For example, referring to FIG. 10, the CSI reference subframe #1 of frame m is in the first CSI subframe set (Set 0), the triggering subframe #4 of frame m is in the second CSI subframe set (Set 1), and the aperiodic CSI request is for the first CSI subframe set. The UE determines a second CSI reference subframe #4 in frame m in the second CSI subframe set, measures CSI in the second CSI reference subframe #4 in frame m, and receives a second aperiodic CSI request in a second triggering subframe #6 of frame m in the first CSI subframe set. The second triggering subframe #6 of frame m is after the second CSI reference subframe #4 in frame m. The second aperiodic CSI request is for the second CSI subframe set.

According to alternative approach 4, which may work in conjunction with alternative approach 1, the CSI in the CSI reference subframe may be measured only when the CSI reference subframe is during a DRX active state of the UE. In such a configuration, the UE may report the CSI measured in the CSI reference subframe only when the CSI reference subframe is during a DRX active state of the UE.

Figure 17:
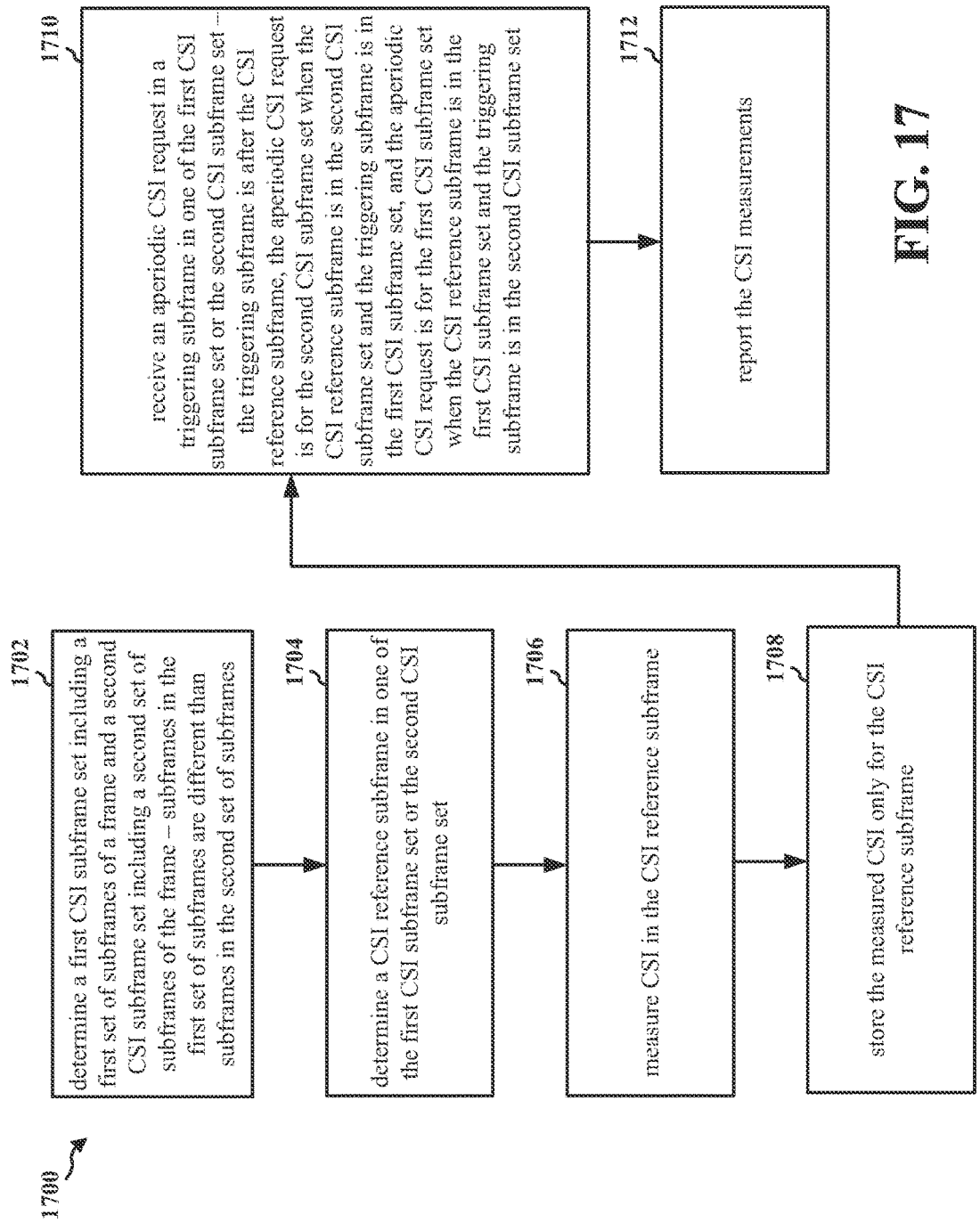
FIG. 17 is a flowchart illustrating the second alternative approach.

FIG. 17 is a flowchart 1700 illustrating the second alternative approach. The method may be performed by a UE, such as the UE 102, 206, 650. At 1702, the UE determines a first CSI subframe set including a first set of subframes of a frame and a second CSI subframe set including a second set of subframes of the frame. Subframes in the first set of subframes are different than subframes in the second set of subframes. For example, referring to FIG. 13, a UE may determine that DL subframes #'s 0, 1, 5, and 6 are in a first CSI subframe set (Set 0), and DL subframes #'s 3, 4, 8, and 9 are in a second CSI subframe set (Set 1).

At 1704, the UE determines a CSI reference subframe in one of the first CSI subframe set or the second CSI subframe set. For example, referring to FIG. 13, a UE may determine that the CSI reference subframe for the first CSI subframe set (Set 0) is subframe #0.

At 1706, the UE measures CSI in the CSI reference subframe. For example, referring to FIG. 13, a UE may measure the CSI in the subframe #0.

At 1708, the UE stores the measured CSI only for the CSI reference subframe. For example, referring to FIG. 13, the UE stores the CSI measured in subframe #0 for later reporting once the A-CSI trigger is received subsequently in subframe #3. However, the UE may not pre-measure and store/buffer CSI measurements for the A-CSI trigger received in subframe #8, as the UE may obtain the CSI measurements for Set 1 from subframe #8.

At 1710, the UE receives an aperiodic CSI request in a triggering subframe in one of the first CSI subframe set or the second CSI subframe set. The triggering subframe is after the CSI reference subframe. The aperiodic CSI request is for the second CSI subframe set when the CSI reference subframe is in the second CSI subframe set and the triggering subframe is in the first CSI subframe set, and the aperiodic CSI request is for the first CSI subframe set when the CSI reference subframe is in the first CSI subframe set and the triggering subframe is in the second CSI subframe set. For example, referring to FIG. 13, a UE receives an aperiodic CSI request in a triggering subframe #3 in the second CSI subframe set (Set 1). The triggering subframe #3 is after the CSI reference subframe #0. In this example, the aperiodic CSI request is for the first CSI subframe set (Set 0), the CSI reference subframe #0 is in the first CSI subframe set (Set 0), and the triggering subframe #3 is in the second CSI subframe set (Set 1).

At 1712, the UE reports the CSI measurements. For example, referring to FIG. 13, in response to the A-CSI request/trigger received in subframe #3, the UE reports the CSI measurements from subframe #0 in subframe #7.

In one configuration, the UE determines a TDD UL/DL configuration, and determines whether the CSI reference subframe is for the first CSI subframe set or the second CSI subframe set based on the TDD UL/DL configuration. In one configuration, the first CSI subframe set includes subframes 0, 1, 5, and 6 of the frame, and the second CSI subframe set includes at least one other subframe of the frame. In such a configuration, the CSI reference subframe is determined to be within the second CSI subframe set when the TDD UL/DL configuration is one of TDD UL/DL configurations 0, 1, 3 or 6, and the CSI reference subframe is determined to be within the first CSI subframe set when the TDD UL/DL configuration is one of TDD UL/DL configurations 2, 4, or 5. According to alternative approach 4, which may work in conjunction with alternative approach 1, the CSI in the CSI reference subframe is measured only when the CSI reference subframe is during a DRX active state of the UE. In the approach, the UE reports the CSI measured in the CSI reference subframe only when the CSI reference subframe is during a DRX active state of the UE.

Figure 18:
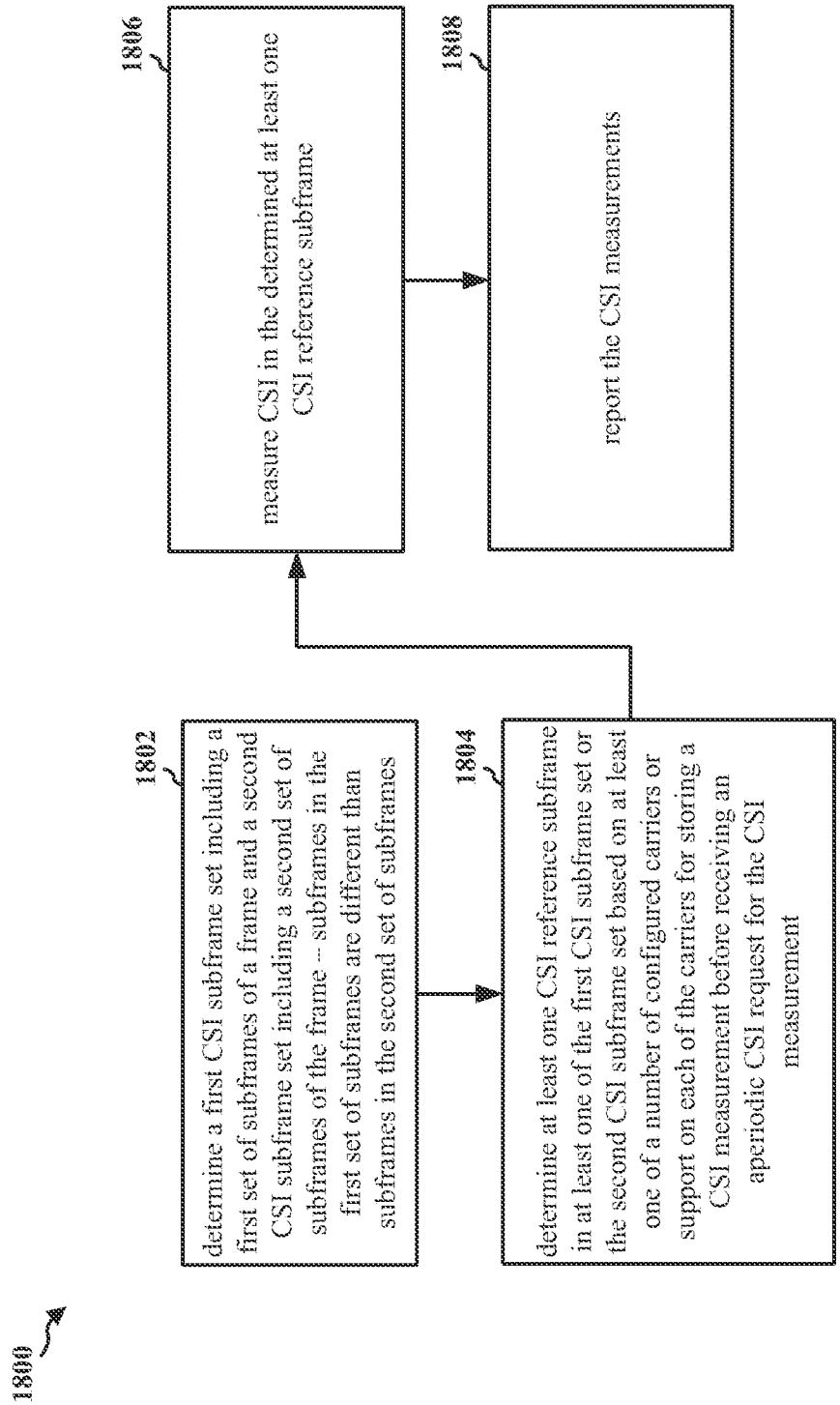
FIG. 18 is a flowchart illustrating the third alternative approach.

FIG. 18 is a flowchart 1800 illustrating the third alternative approach. The method may be performed by a UE, such as the UE 102, 206, 650. At 1802, the UE determines a first CSI subframe set including a first set of subframes of a frame and a second CSI subframe set including a second set of subframes of the frame. Subframes in the first set of subframes are different than subframes in the second set of subframes. At 1804, the UE determines at least one CSI reference subframe in at least one of the first CSI subframe set or the second CSI subframe set based on at least one of a number of configured carriers or support on each of the carriers for storing a CSI measurement before receiving an aperiodic CSI request for the CSI measurement (UE capability). For example, as discussed supra, a UE may determine whether to use approach 1 or approach 2 based on a number of configured carriers and/or UE capability (whether each of the configured carriers support storing a CSI measurement before receiving an aperiodic CSI request for the CSI measurement). At 1806, the UE measures CSI in the determined at least one CSI reference subframe. At 1808, the UE reports the CSI measurements.

Figure 19:
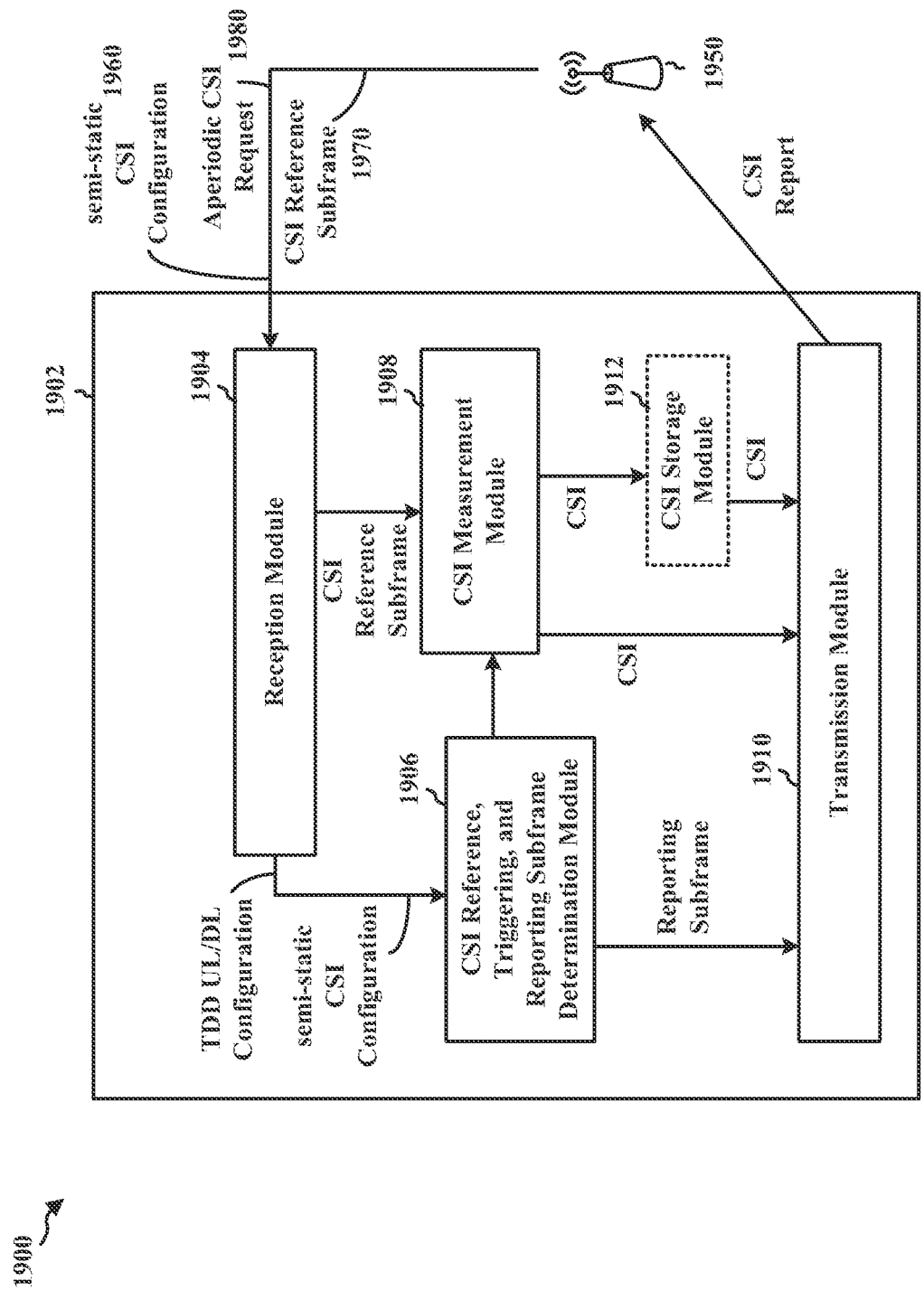
FIG. 19 is a conceptual data flow diagram illustrating the data flow between different modules/means/components in an exemplary apparatus.

FIG. 19 is a conceptual data flow diagram 1900 illustrating the data flow between different modules/means/components in an exemplary apparatus 1902. The apparatus 1902 may be a UE, such as the UE 102, 206, 650. The apparatus 1902 includes a reception module 1904, a CSI reference, triggering, and reporting subframe determination module (referred to herein as "CSI subframe determination module") 1906, a CSI measurement module 1908, and a transmission module 1910. The apparatus may further include a CSI storage module 1912.

In a first configuration, the CSI subframe determination module 1906 is configured to determine a first CSI subframe set including a first set of subframes of a frame and a second CSI subframe set including a second set of subframes of the frame. Subframes in the first set of subframes are different than subframes in the second set of subframes. The CSI subframe determination module 1906 is further configured to determine a CSI reference subframe 1970 in one of the first CSI subframe set or the second CSI subframe set. The reception module 1904 is configured to receive the CSI reference subframe 1970 and to provide the CSI reference subframe or information for measuring the CSI within the CSI reference subframe to the CSI measurement module 1908. The CSI measurement module 1908 is configured to measure CSI in the CSI reference subframe 1970. The reception module 1904 is configured to receive an aperiodic CSI request 1980 in a triggering subframe in one of the first CSI subframe set or the second CSI subframe set. The triggering subframe is after the CSI reference subframe. The aperiodic CSI request is for the second CSI subframe set When the CSI reference subframe is in the second CSI subframe set and the triggering subframe is in the first CSI subframe set, and the aperiodic CSI request is for the first CSI subframe set when the CSI reference subframe is in the first CSI subframe set and the triggering subframe is in the second CSI subframe set.

In one configuration, the CSI reference subframe is in the second CSI subframe set, the triggering subframe is in the first CSI subframe set, and the aperiodic CSI request is received for the second CSI subframe set. In such a configuration, the CSI subframe determination module 1906 is configured to determine a reporting subframe in which the aperiodic CSI measurements are to be reported. In addition, the CSI subframe determination module 1906 is configured to determine whether there is a downlink subframe within the second CSI subframe set between the triggering subframe and the reporting subframe. The triggering subframe is located at least four subframes before the reporting subframe. The CSI measurement module 1908 is configured to measure CSI in the downlink subframe when there is the downlink subframe within the second CSI subframe set between the triggering subframe and the reporting subframe, and the downlink subframe is at least four subframes before the reporting subframe.

In one configuration, the transmission module 1910 is configured to report, within the reporting, subframe, the CSI measurements from the CSI reference subframe when there is no downlink subframe at least four subframes before the reporting subframe and within the second CSI subframe set between the triggering subframe and the reporting subframe. In one configuration, the transmission module 1910 is configured to report, within the reporting subframe, the CSI measurements from the downlink subframe when there is the downlink subframe at least four subframes before the reporting subframe and within the second CSI subframe set between the triggering subframe and the reporting subframe.

In one configuration, the reception module 1904 may be configured to receive a semi-static CSI configuration 1960 of the CSI reference subframe through RRC signaling. The reception module 1904 may provide the semi-static CSI configuration 1960 to the CSI subframe determination module 1906. The CSI subframe determination module 1906 may determine the CSI reference subframe to be a first downlink subframe within the one of the first CSI subframe set or the second CSI subframe set.

In one configuration, the CSI reference subframe is in the first CSI subframe set, the triggering subframe is in the second CSI subframe set, and the aperiodic CSI request is for the first CSI subframe set. In such a configuration, the CSI subframe determination module 1906 is configured to determine a second CSI reference subframe in the second CSI subframe set. In addition, the CSI measurement module 1908 is configured to measure CSI in the second CSI reference subframe. Further, the reception module 1904 is configured to receive a second aperiodic CSI request in a second triggering subframe in the first CSI subframe set. The second triggering subframe is after the second CSI reference subframe. The second aperiodic CSI request is for the second CSI subframe set. In one configuration, the CSI reference subframe and the second CSI reference subframe are the only two CSI reference subframes in the first CSI subframe set and the second CSI subframe set.

In one configuration, the CSI measurement module 1908 measures the CSI in the CSI reference subframe only when the CSI reference subframe is during a DRX active state of the UE, and the transmission module 1910 reports the CSI measured in the CSI reference subframe only when the CSI reference subframe is during a DRX active state of the UE.

In a second configuration, the CSI subframe determination module 1906 is configured to determine a first CSI subframe set including a first set of subframes of a frame and a second CSI subframe set including a second set of subframes of the frame. Subframes in the first set of subframes are different than subframes in the second set of subframes. In addition, the CSI subframe determination module 1906 is configured to determine a CSI reference subframe in one of the first CSI subframe set or the second CSI subframe set. The CSI measurement module 1908 is configured to measure CSI in the CSI reference subframe. The CSI storage module 1912 is configured to store the measured CSI only for the CSI reference subframe. The reception module 1904 is configured to receive an aperiodic CSI request in a triggering subframe in one of the first CSI subframe set or the second CSI subframe set. The triggering subframe is after the CSI reference subframe. The aperiodic CSI request is for the second CSI subframe set when the CSI reference subframe is in the second CSI subframe set and the triggering subframe is in the first CSI subframe set, and the aperiodic CSI request is for the first CSI subframe set when the CSI reference subframe is in the first CSI subframe set and the triggering subframe is in the second CSI subframe set.

In one configuration, the CSI subframe determination module 1906 may also determine a TDD uplink/downlink configuration, and determine whether the CSI reference subframe is for the first CSI subframe set or the second CSI subframe set based on the TDD uplink/downlink configuration. In one configuration, the first CSI subframe set includes subframes 0, 1, 5, and 6 of the frame, and the second CSI subframe set includes at least one other subframe of the frame. In such a configuration, the CSI reference subframe is determined to be within the second CSI subframe set when the TDD uplink/downlink configuration is one of TDD uplink/downlink configurations 0, 1, 3 or 6, and the CSI reference subframe is determined to be within the first CSI subframe set when the TDD uplink/downlink configuration is one of TDD uplink/downlink configurations 2, 4, or 5. In one configuration, the CSI subframe determination module 1906 is configured to measure the CSI in the CSI reference subframe only when the CSI reference subframe is during a DRX active state of the UE, and the transmission module 1910 is configured to report the CSI measured in the CSI reference subframe only when the CSI reference subframe is during a DRX active state of the UE.

As discussed supra, the alternative approaches 1, 2, 3, and 4 may be performed by an apparatus, such as the UE 102, 206, 650. The apparatus may include additional modules that perform each of the blocks of the algorithm in the aforementioned flowcharts of FIGS. 16-18. As such, each block in the aforementioned flowcharts of FIGS. 16-18 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof. The computer-readable medium stores computer executable code for wireless communication, and in particular, for performing at least one of alternative approaches 1, 2, 3, and/or 4.

Figure 20:
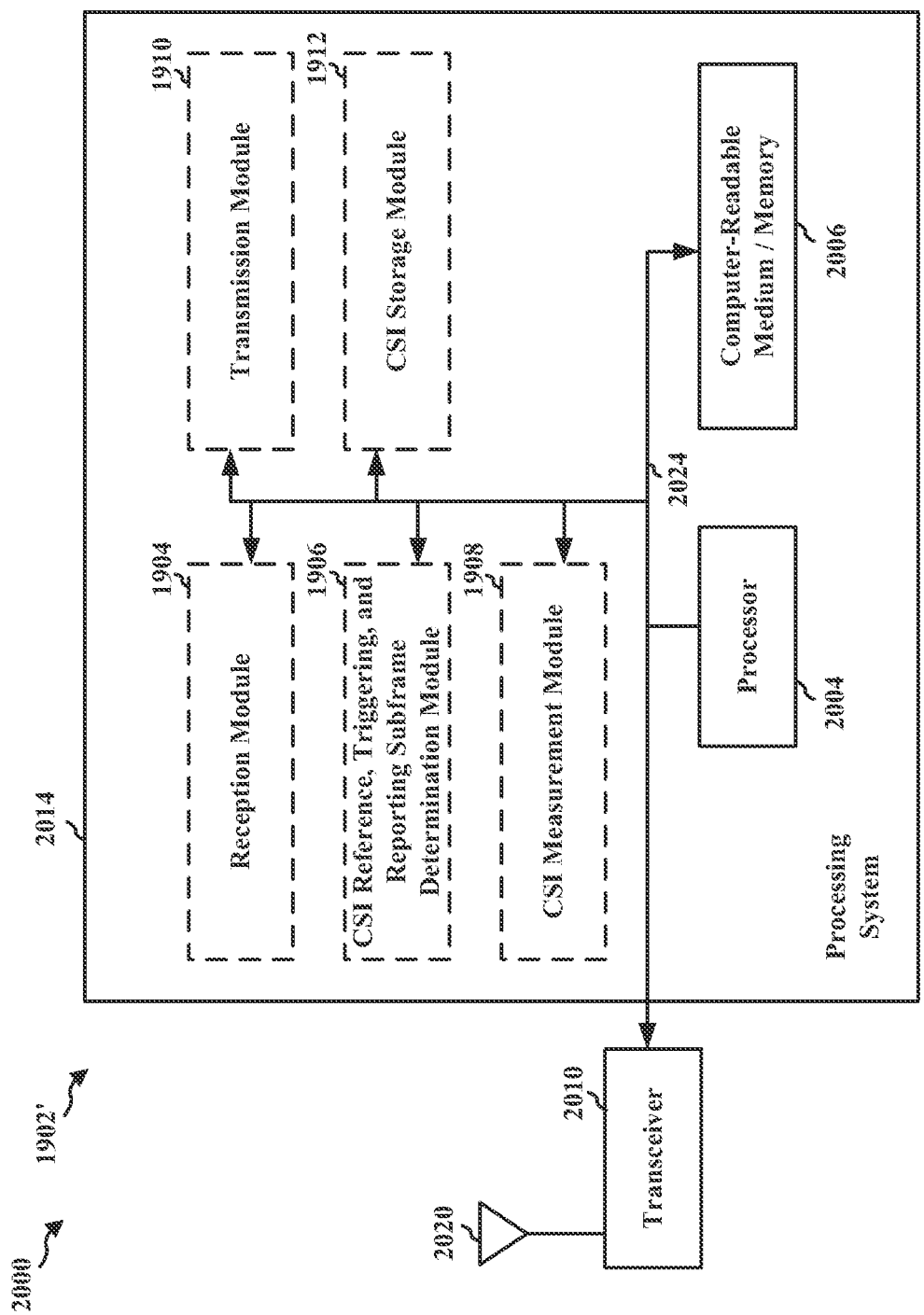
FIG. 20 is a diagram illustrating an example of a hardware implementation for an apparatus employing a processing system.

FIG. 20 is a diagram 2000 illustrating an example of a hardware implementation for an apparatus 1902' employing a processing system 2014. The processing system 2014 may be implemented with a bus architecture, represented generally by the bus 2024. The bus 2024 may include any number of interconnecting buses and bridges depending on the specific application of the processing system 2014 and the overall design constraints. The bus 2024 links together various circuits including one or more processors and/or hardware modules, represented by the processor 2004, the modules 1904, 1906, 1908, 1910, and 1912 and the computer-readable medium/memory 2006. The bus 2024 may also link various other circuits such as timing sources, peripherals, voltage regulators, and power management circuits, which are well known in the art, and therefore, will not be described any further.

The processing system 2014 may be coupled to a transceiver 2010. The transceiver 2010 is coupled to one or more antennas 2020. The transceiver 2010 provides a means for communicating with various other apparatus over a transmission medium. The transceiver 2010 receives a signal from the one or more antennas 2020, extracts information from the received signal, and provides the extracted information to the processing system 2014, specifically the reception module 1904. In addition, the transceiver 2010 receives information from the processing system 2014, specifically the transmission module 1910, and based on the received information, generates a signal to be applied to the one or more antennas 2020. The processing system 2014 includes a processor 2004 coupled to a computer-readable medium/memory 2006. The processor 2004 is responsible for general processing, including the execution of software stored on the computer-readable medium/memory 2006. The software, when executed by the processor 2004, causes the processing system 2014 to perform the various functions described supra for any particular apparatus. The computer-readable medium/memory 2006 may also be used for storing data that is manipulated by the processor 2004 when executing software. The processing system further includes at least one of the modules 1904, 1906, 1908, 1910, and 1912. The modules may be software modules running in the processor 2004, resident/stored in the computer readable medium/memory 2006, one or more hardware modules coupled to the processor 2004, or some combination thereof. The processing system 2014 may be a component of the UE 650 and may include the memory 660 and/or at least one of the TX processor 668, the RX processor 656, and the controller/processor 659.

In one configuration, the apparatus 1902/1902' for wireless communication includes means for determining a first CSI subframe set including a first set of subframes of a frame and a second CSI subframe set including a second set of subframes of the frame. Subframes in the first set of subframes are different than subframes in the second set of subframes. In addition, the apparatus includes means for determining a CSI reference subframe in one of the first CSI subframe set or the second CSI subframe set. In addition, the apparatus includes means for measuring CSI in the CSI reference subframe. In addition, the apparatus includes means for receiving an aperiodic CSI request in a triggering subframe in one of the first CSI subframe set or the second CSI subframe set. The triggering subframe is after the CSI reference subframe. The aperiodic CSI request is for the second CSI subframe set when the CSI reference subframe is in the second CSI subframe set and the triggering subframe is in the first CSI subframe set, and the aperiodic CSI request is for the first CSI subframe set when the CSI reference subframe is in the first CSI subframe set and the triggering subframe is in the second CSI subframe set.

In one configuration, the CSI reference subframe is in the second CSI subframe set, the triggering subframe is in the first CSI subframe set, and the aperiodic CSI request is received for the second CSI subframe set. In such a configuration, the apparatus further includes means for determining a reporting subframe in which the aperiodic CSI measurements are to be reported. In addition, the apparatus further includes means for determining whether there is a downlink subframe within the second CSI subframe set between the triggering subframe and the reporting subframe. The triggering subframe is located at least four subframes before the reporting subframe. In addition, the apparatus includes means for measuring CSI in the downlink subframe when there is the downlink subframe within the second CSI subframe set between the triggering subframe and the reporting subframe, and the downlink subframe is at least four subframes before the reporting subframe.

In one configuration, the apparatus further includes means for reporting, within the reporting subframe, the CSI measurements from the CSI reference subframe when there is no downlink subframe at least four subframes before the reporting subframe and within the second CSI subframe set between the triggering subframe and the reporting subframe. In one configuration, the apparatus further includes means for reporting, within the reporting subframe, the CSI measurements from the downlink subframe when there is the downlink subframe at least four subframes before the reporting subframe and within the second CSI subframe set between the triggering subframe and the reporting subframe. In one configuration, the apparatus further includes means for receiving a semi-static configuration of the CSI reference subframe through RRC signaling. In one configuration, the CSI reference subframe is determined to be a first downlink subframe within the one of the first CSI subframe set or the second CSI subframe set.

In one configuration, the CSI reference subframe is in the first CSI subframe set, the triggering subframe is in the second CSI subframe set, and the aperiodic CSI request is for the first CSI subframe set. in such a configuration, the apparatus includes means for determining a second CSI reference subframe in the second CSI subframe set, means for measuring CSI in the second CSI reference subframe, and means for receiving a second aperiodic CSI request in a second triggering subframe in the first CSI subframe set. The second triggering subframe is after the second CSI reference subframe. The second aperiodic CSI request is for the second CSI subframe set. In one configuration, the CSI reference subframe and the second CSI reference subframe are the only two CSI reference subframes in the first CSI subframe set and the second CSI subframe set. In one configuration, the CSI in the CSI reference subframe is measured only when the CSI reference subframe is during a DRX active state of the UE. In such a configuration, the apparatus further includes means for reporting the CSI measured in the CSI reference subframe only when the CSI reference subframe is during a DRX active state of the UE.

The aforementioned means may be one or more of the aforementioned modules of the apparatus 1902 and/or the processing system 2014 of the apparatus 1902' configured to perform the functions recited by the aforementioned means. As described supra, the processing system 2014 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

In one configuration, the apparatus 1902/1902' for wireless communication includes means for determining a first CSI subframe set including a first set of subframes of a frame and a second CSI subframe set including a second set of subframes of the frame. Subframes in the first set of subframes are different than subframes in the second set of subframes. The apparatus further includes means for determining a CSI reference subframe in one of the first CSI subframe set or the second CSI subframe set, means for measuring CSI in the CSI reference subframe, means for storing the measured CSI only for the CSI reference subframe, and means for receiving an aperiodic CSI request in a triggering subframe in one of the first CSI subframe set or the second CSI subframe set. The triggering subframe is after the CSI reference subframe. The aperiodic CSI request is for the second CSI subframe set when the CSI reference subframe is in the second CSI subframe set and the triggering subframe is in the first CSI subframe set, and the aperiodic CSI request is for the first CSI subframe set when the CSI reference subframe is in the first CSI subframe set and the triggering subframe is in the second CSI subframe set.

In one configuration, the apparatus further includes means for determining a TDD/downlink configuration, and means for determining whether the CSI reference subframe is for the first CSI subframe set or the second CSI subframe set based on the TDD uplink/downlink configuration. In one configuration, the first CSI subframe set includes subframes 0, 1, 5, and 6 of the frame, and the second CSI subframe set includes at least one other subframe of the frame. In such a configuration, the CSI reference subframe is determined to be within the second CSI subframe set when the TDD uplink/downlink configuration is one of TDD uplink/downlink configurations 0, 1, 3 or 6, and the CSI reference subframe is determined to be within the first CSI subframe set when the TDD uplink/downlink configuration is one of TDD uplink/downlink configurations 2, 4, or 5.

In one configuration, the CSI in the CSI reference subframe is measured only when the CSI reference subframe is during a DRX active state of the UE. In such a configuration, the apparatus further includes means for reporting the CSI measured in the CSI reference subframe only when the CSI reference subframe is during a DRX active state of the UE.

The aforementioned means may be one or more of the aforementioned modules of the apparatus 1902 and/or the processing system 2014 of the apparatus 1902' configured to perform the functions recited by the aforementioned means. As described supra, the processing system 2014 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
   determining a first channel state information (CSI) subframe set including a first set of subframes of a frame and a second CSI subframe set including a second set of subframes of the frame, subframes in the first set of subframes being different than subframes in the second set of subframes;
   determining a CSI reference subframe in one of the first CSI subframe set or the second CSI subframe set;
   measuring CSI in the CSI reference subframe; and
   receiving an aperiodic CSI request in a triggering subframe in one of the first CSI subframe set or the second CSI subframe set, the triggering subframe being after the CSI reference subframe, wherein the aperiodic CSI request is for the second CSI subframe set when the CSI reference subframe is in the second CSI subframe set and the triggering subframe is in the first CSI subframe set, and the aperiodic CSI request is for the first CSI subframe set when the CSI reference subframe is in the first CSI subframe set and the triggering subframe is in the second CSI subframe set.

2. The method of claim 1, wherein the CSI reference subframe is in the second CSI subframe set, the triggering subframe is in the first CSI subframe set, and the aperiodic CSI request is received for the second CSI subframe set, the method further comprising:
   determining a reporting subframe in which the aperiodic CSI measurements are to be reported;
   determining whether there is a downlink subframe within the second CSI subframe set between the triggering subframe and the reporting subframe, the triggering subframe being located at least four subframes before the reporting subframe; and
   measuring CSI in said downlink subframe when there is said downlink subframe within the second CSI subframe set between the triggering subframe and the reporting subframe, and said downlink subframe is at least four subframes before the reporting subframe.

3. The method of claim 2, further comprising reporting, within the reporting subframe, the CSI measurements from the CSI reference subframe when there is no said downlink subframe at least four subframes before the reporting subframe and within the second CSI subframe set between the triggering subframe and the reporting subframe.

4. The method of claim 2, further comprising reporting, within the reporting subframe, the CSI measurements from said downlink subframe when there is said downlink subframe at least four subframes before the reporting subframe and within the second CSI subframe set between the triggering subframe and the reporting subframe.

5. The method of claim 1, further comprising receiving a semi-static configuration of the CSI reference subframe through radio resource control (RRC) signaling.

6. The method of claim 1, wherein the CSI reference subframe is determined to be a first downlink subframe within said one of the first CSI subframe set or the second CSI subframe set.

7. The method of claim 1, wherein the CSI reference subframe is in the first CSI subframe set, the triggering subframe is in the second CSI subframe set, and the aperiodic CSI request is for the first CSI subframe set, and the method further comprises:
   determining a second CSI reference subframe in the second CSI subframe set;
   measuring CSI in the second CSI reference subframe; and
   receiving a second aperiodic CSI request in a second triggering subframe in the first CSI subframe set, the second triggering subframe being after the second CSI reference subframe, the second aperiodic CSI request being for the second CSI subframe set.

8. The method of claim 7, wherein the CSI reference subframe and the second CSI reference subframe are the only two CSI reference subframes in the first CSI subframe set and the second CSI subframe set.

9. The method of claim 1, wherein the method is performed by a user equipment (UE), the CSI in the CSI reference subframe is measured only when the CSI reference subframe is during a discontinuous reception (DRX) active state of the UE, and the method further comprises reporting the CSI measured in the CSI reference subframe only when the CSI reference subframe is during a DRX active state of the UE.

10. A method of wireless communication, comprising:
determining a first channel state information (CSI) subframe set including a first set of subframes of a frame and a second CSI subframe set including a second set of subframes of the frame, subframes in the first set of subframes being different than subframes in the second set of subframes;
determining a CSI reference subframe in one of the first CSI subframe set or the second CSI subframe set;
measuring CSI in the CSI reference subframe;
storing the measured CSI only for the CSI reference subframe; and
receiving an aperiodic CSI request in a triggering subframe in one of the first CSI subframe set or the second CSI subframe set, the triggering subframe being after the CSI reference subframe, wherein the aperiodic CSI request is for the second CSI subframe set when the CSI reference subframe is in the second CSI subframe set and the triggering subframe is in the first CSI subframe set, and the aperiodic CSI request is for the first CSI subframe set when the CSI reference subframe is in the first CSI subframe set and the triggering subframe is in the second CSI subframe set.

11. The method of claim 10, further comprising:
determining a time division duplex (TDD) uplink/downlink configuration; and
determining whether the CSI reference subframe is for the first CSI subframe set or the second CSI subframe set based on the TDD uplink/downlink configuration.

12. The method of claim 11, wherein the first CSI subframe set includes subframes 0, 1, 5, and 6 of the frame, and the second CSI subframe set includes at least one other subframe of the frame, wherein the CSI reference subframe is determined to be within the second CSI subframe set when the TDD uplink/downlink configuration is one of TDD uplink/downlink configurations 0, 1, 3 or 6, and wherein the CSI reference subframe is determined to be within the first CSI subframe set when the TDD uplink/downlink configuration is one of TDD uplink/downlink configurations 2, 4, or 5.

13. The method of claim 10, wherein the method is performed by a user equipment (UE), the CSI in the CSI reference subframe is measured only when the CSI reference subframe is during a discontinuous reception (DRX) active state of the UE, and the method further comprises reporting the CSI measured in the CSI reference subframe only when the CSI reference subframe is during a DRX active state of the UE.

14. An apparatus for wireless communication, comprising:
a memory; and
at least one processor coupled to the memory and configured to:
determine a first channel state information (CSI) subframe set including a first set of subframes of a frame and a second CSI subframe set including a second set of subframes of the frame, subframes in the first set of subframes being different than subframes in the second set of subframes;
determine a CSI reference subframe in one of the first CSI subframe set or the second CSI subframe set;
measure CSI in the CSI reference subframe; and
receive an aperiodic CSI request in a triggering subframe in one of the first CSI subframe set or the second CSI subframe set, the triggering subframe being after the CSI reference subframe, wherein the aperiodic CSI request is for the second CSI subframe set when the CSI reference subframe is in the second CSI subframe set and the triggering subframe is in the first CSI subframe set, and the aperiodic CSI request is for the first CSI subframe set when the CSI reference subframe is in the first CSI subframe set and the triggering subframe is in the second CSI subframe set.

15. The apparatus of claim 14, wherein the CSI reference subframe is in the second CSI subframe set, the triggering subframe is in the first CSI subframe set, and the aperiodic CSI request is received for the second CSI subframe set, the at least one processor is further configured to:
determine a reporting subframe in which the aperiodic CSI measurements are to be reported;
determine whether there is a downlink subframe within the second CSI subframe set between the triggering subframe and the reporting subframe, the triggering subframe being located at least four subframes before the reporting subframe; and
measure CSI in said downlink subframe when there is said downlink subframe within the second CSI subframe set between the triggering subframe and the reporting subframe, and said downlink subframe is at least four subframes before the reporting subframe.

16. The apparatus of claim 15, wherein the at least one processor is further configured to report, within the reporting subframe, the CSI measurements from the CSI reference subframe when there is no said downlink subframe at least four subframes before the reporting subframe and within the second CSI subframe set between the triggering subframe and the reporting subframe.

17. The apparatus of claim 15, wherein the at least one processor is further configured to report, within the reporting subframe, the CSI measurements from said downlink subframe when there is said downlink subframe at least four subframes before the reporting subframe and within the second CSI subframe set between the triggering subframe and the reporting subframe.

18. The apparatus of claim 14, wherein the at least one processor is further configured to receive a semi-static configuration of the CSI reference subframe through radio resource control (RRC) signaling.

19. The apparatus of claim 14, wherein the CSI reference subframe is determined to be a first downlink subframe within said one of the first CSI subframe set or the second CSI subframe set.

20. The apparatus of claim 14, wherein the CSI reference subframe is in the first CSI subframe set, the triggering subframe is in the second CSI subframe set, and the aperiodic CSI request is for the first CSI subframe set, and the at least one processor is further configured to:
determine a second CSI reference subframe in the second CSI subframe set;
measure CSI in the second CSI reference subframe; and
receive a second aperiodic CSI request in a second triggering subframe in the first CSI subframe set, the second triggering subframe being after the second CSI reference subframe, the second aperiodic CSI request being for the second CSI subframe set.

21. The apparatus of claim 20, wherein the CSI reference subframe and the second CSI reference subframe are the only two CSI reference subframes in the first CSI subframe set and the second CSI subframe set.

22. The apparatus of claim 14, wherein the apparatus is performed by a user equipment (UE), the CSI in the CSI reference subframe is measured only when the CSI reference subframe is during a discontinuous reception (DRX) active state of the UE, and the at least one processor is further configured to report the CSI measured in the CSI reference subframe only when the CSI reference subframe is during a DRX active state of the UE.

23. An apparatus for wireless communication, comprising:
a memory; and
at least one processor coupled to the memory and configured to:
determine a first channel state information (CSI) subframe set including a first set of subframes of a frame and a second CSI subframe set including a second set of subframes of the frame, subframes in the first set of subframes being different than subframes in the second set of subframes;
determine a CSI reference subframe in one of the first CSI subframe set or the second CSI subframe set;
measure CSI in the CSI reference subframe;
store the measured CSI only for the CSI reference subframe; and
receive an aperiodic CSI request in a triggering subframe in one of the first CSI subframe set or the second CSI subframe set, the triggering subframe being after the CSI reference subframe, wherein the aperiodic CSI request is for the second CSI subframe set when the CSI reference subframe is in the second CSI subframe set and the triggering subframe is in the first CSI subframe set, and the aperiodic CSI request is for the first CSI subframe set when the CSI reference subframe is in the first CSI subframe set and the triggering subframe is in the second CSI subframe set.

24. The apparatus of claim 23, wherein the at least one processor is further configured to:
determine a time division duplex (TDD) uplink/downlink configuration; and
determine whether the CSI reference subframe is for the first CSI subframe set or the second CSI subframe set based on the TDD uplink/downlink configuration.

25. The apparatus of claim 24, wherein the first CSI subframe set includes subframes 0, 1, 5, and 6 of the frame, and the second CSI subframe set includes at least one other subframe of the frame, wherein the CSI reference subframe is determined to be within the second CSI subframe set when the TDD uplink/downlink configuration is one of TDD uplink/downlink configurations 0, 1, 3 or 6, and wherein the CSI reference subframe is determined to be within the first CSI subframe set when the TDD uplink/downlink configuration is one of TDD uplink/downlink configurations 2, 4, or 5.

26. The apparatus of claim 23, wherein the apparatus is performed by a user equipment (UE), the CSI in the CSI reference subframe is measured only when the CSI reference subframe is during a discontinuous reception (DRX) active state of the UE, and the at least one processor is further configured to report the CSI measured in the CSI reference subframe only when the CSI reference subframe is during a DRX active state of the UE.

* * * * *